US012621185B2

(12) United States Patent
Tochio

(10) Patent No.: US 12,621,185 B2
(45) Date of Patent: May 5, 2026

(54) TRANSMISSION METHOD AND TRANSMISSION APPARATUS IN RING NETWORK

(75) Inventor: Yuji Tochio, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5229 days.

(21) Appl. No.: 12/382,910

(22) Filed: Mar. 26, 2009

(65) Prior Publication Data

US 2009/0323521 A1      Dec. 31, 2009

(30) Foreign Application Priority Data

Jun. 27, 2008    (JP) ................................. 2008-168605

(51) Int. Cl.
 *G01R 31/08*        (2006.01)
 *H04L 12/42*        (2006.01)
(52) U.S. Cl.
 CPC .................................... *H04L 12/42* (2013.01)
(58) Field of Classification Search
 USPC ........ 370/235, 382, 237, 352–356, 222–225, 370/258
 See application file for complete search history.

(56) References Cited

U.S. PATENT DOCUMENTS

| 7,298,700 | B1 * | 11/2007 | Doverspike et al. ......... 370/235 |
| 2002/0172150 | A1 | 11/2002 | Kano |
| 2008/0304407 | A1 * | 12/2008 | Umansky et al. ............ 370/222 |
| 2010/0091647 | A1 * | 4/2010 | Li et al. ........................ 370/225 |

FOREIGN PATENT DOCUMENTS

JP            2002-344493            11/2002

* cited by examiner

*Primary Examiner* — Iqbal Zaidi
(74) *Attorney, Agent, or Firm* — STAAS & HALSEY LLP

(57)            ABSTRACT

According to the transmission method, labels to be used at the failure occurrence are previously and individually set to links in respective directions among all nodes on the one directional link connecting between adjacent nodes basis, and when a failure occurs, a failure notifying message is sent out onto a same directional ring from a termination node of a failed block, to be sequentially transferred to each downstream node, and a label table for connecting the links in cooperative with the reception of the failure notifying message is created in each node, and also, a bypassing path is formed by turning back the rings at both end nodes of the failed block. Thus, in a ring network of label switching system, it becomes possible to easily perform the label table management and also to set a bypassing path in a short time at the failure occurrence.

16 Claims, 17 Drawing Sheets

| Lin | Lout |
|-----|------|
| 102 | 602 |

LT(#6)

| Lin | Lout |
|-----|------|
| 602 | 502 |

LT(#2)

| Lin | Lout |
|-----|------|
| 202 | 102 |

LT(#5)

| Lin | Lout |
|-----|------|
| 502 | 402 |

LT(#4)

| Lin | Lout |
|-----|------|
| def 402 | ghi |

LT(#3)

| Lin | Lout |
|-----|------|
| abc | def 202 |

REPEATER
OR THE LIKE

Mf′
(CONTAINING INFORMATION
RELATING TO LABEL 301)

Figure 11:
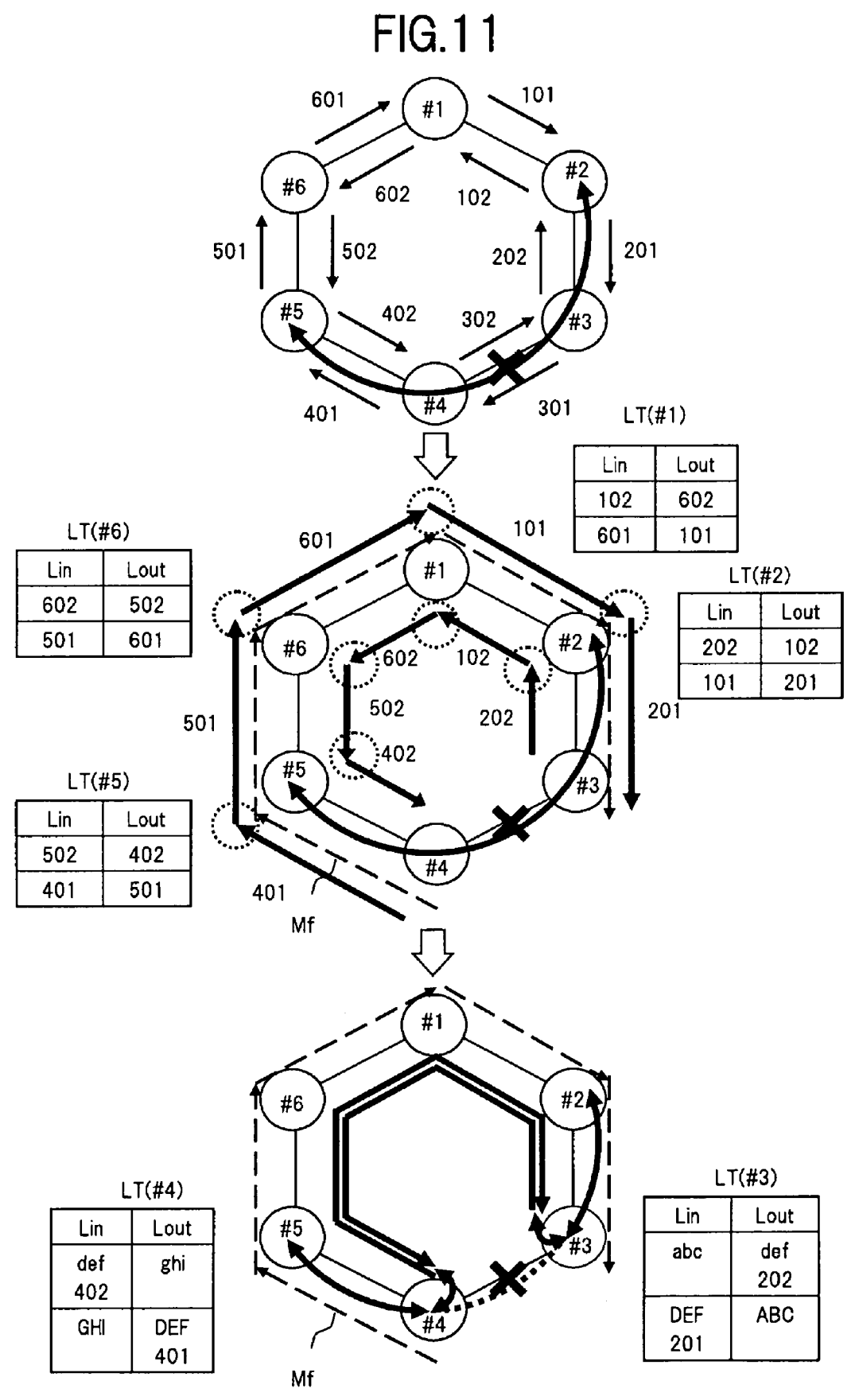

| Lin | Lout |
|-----|------|
| 102 | 602 |
| 601 | 101 |

LT(#6)

| Lin | Lout |
|-----|------|
| 602 | 502 |
| 501 | 601 |

LT(#2)

| Lin | Lout |
|-----|------|
| 202 | 102 |
| 101 | 201 |

LT(#5)

| Lin | Lout |
|-----|------|
| 502 | 402 |
| 401 | 501 |

LT(#4)

| Lin | Lout |
|---------|---------|
| def 402 | ghi |
| GHI | DEF 401 |

LT(#3)

| Lin | Lout |
|---------|---------|
| abc | def 202 |
| DEF 201 | ABC |

TRANSMISSION METHOD AND TRANSMISSION APPARATUS IN RING NETWORK

CROSS-REFERENCE TO RELATED APPLICATION

This application is based upon and claims the benefit of priority of the prior Japanese Patent Application No. 2008-168605, filed on Jun. 27, 2008, the entire contents of which are incorporated herein by reference.

FIELD

The embodiments discussed herein are related to a transmission method and a transmission apparatus for performing an avoidance control for when a failure occurs in a ring network applied with a label switching system.

BACKGROUND

In recent years, with the advancement of a packet technology, the application of packet to a carrier domain has been progressed. Further, a ring network is available as a network form capable of effectively interconnecting transmission paths. Therefore, an emphasis is placed on the application of packet technology to the ring network. In order to cope with such a situation, there has been proposed a ring network applied with a label switching system in which a packet added with a label, such as a MPLS (Multi-Protocol Label Switching) or the like, is transmitted and exchanged among nodes on a path.

Further, with the extension of packet technology in the carrier domains, an avoidance control technology (to be referred to as a protection technology, hereunder) for restoring in a short time a state where the packet transmission is suspended due to the failure occurrence becomes important, and in particular, a protection system without the necessity of getting help from an operator is desirable to be realized. Such a protection system can be applied not only when the failure occurs, but also when the network is extended on the basis of a ring form or when a plurality of rings is interconnected.

As a conventional protection system in the ring network applied with the label switching system, as illustrated in FIG. 18, there has been proposed a system in which, separately from an active path through which user data is transmitted over a ring in one direction, a loop redundant path in which the data flow is opposite to that in the active path is previously set, and at the failure occurrence, the label matching (label table) in nodes adjacent to a failed block (node #4 and node #5 in the example in the figure) is changed to thereby switch between the active path and the redundant path, so that the user data bypasses the failed block (refer to Japanese Laid-open Patent Publication No. 2002-344493).

However, in the conventional protection system in the ring network applied with the label switching system as described above, there is a problem in that if the number of nodes on the ring or the number of links among nodes is increased, the label table of redundant path-compliant prepared for each node becomes complicated and the management thereof becomes hard. For example, in a network as illustrated in FIG. 19 in which six nodes are connected in a ring-shape, in order to realize the protection at an arbitrary site for a clockwise active path, since each node is required to verify the circularity of the redundant path, there are set six counterclockwise redundant paths each of which starting point/termination point is set at each node (arrow lines in the ring in FIG. 19). Further, similarly to this, for a counter-clockwise active path, six clockwise redundant paths are set (arrow lines outside the ring in FIG. 19). Thus, it becomes necessary to set a label table corresponding to each of the 12 redundant paths in each node on the ring. Namely, the label tables of four times the number of nodes are set for one node, and therefore, if the number of nodes (or the number of links) on the ring is increased, the label management becomes complicated in the entire network.

In order to solve the above problems, for setting only one redundant path for one directional active path to perform the effective protection, in the conventional technology, it is necessary to verify the connectivity of a bypassing path when the active path/redundant path switching processing is performed at the failure occurrence. This verification of connectivity is normally performed by a turning-back test (a loopback test), and therefore, a control signal for the test reciprocates the bypassing path for one time. A time required for the one time reciprocation of the control signal increases a switching processing time of the active path/redundant path, and therefore, it becomes hard to realize the protection in a short time. Thus, when the setting number of the redundant paths is reduced (efficiently improved) to achieve the easy of label management, there is also a problem of how the path switching processing time containing the connectivity verification of the bypassing path is shortened.

SUMMARY

According to an aspect of the invention, a transmission method for performing an avoidance control at the failure occurrence in a ring network which applies a label switching system among a plurality of nodes connected in a ring shape to transmit a packet in bidirectional, includes the following processes (A) to (E).

Firstly, (A): previously and individually setting labels to be used at the failure occurrence to links in respective directions among all nodes on the one directional link connecting between adjacent nodes basis. Next, (B): when a failure occurs in a ring in either direction, in the node positioned on a termination point of a failed block, sending out a failure notifying message which notifies the failure occurrence onto the ring in the same direction, and at the same time, connecting between an output port on the same directional ring side in the own node and an input port on the opposite directional ring side in the own node to thereby form a path for turning back the rings of respective directions, and also, rewriting a label table of the own node corresponding to the formed path, to store it.

Further, (C): sequentially transferring the failure notifying message sent out onto the ring in the same direction by each downstream node, and at the same time, in each node transferred the failure notifying message, for the labels to be used at the failure occurrence, creating a label table for connecting together two links adjacent to the own node on the opposite directional ring, to store it.

Furthermore, (D): terminating the failure notifying message sequentially transferred by each downstream node at the node positioned on a starting point of the failed block, and at the same time, in the node at which the failure notifying message is terminated, connecting between an input port on the same directional ring side in the own node and an output port on the opposite directional ring side in the own node to thereby form a path for turning back the rings of respective directions, and also, rewriting a label table of the own node corresponding to the formed path, to store it.

Then, (E): during the failure occurrence, label switching the packet reached the failed block in accordance with the label table stored in each node to transmit it, and making the packet to bypass the failed block.

According to the transmission method as described above, focusing on a network configuration called a ring form, the labels to be used at the failure occurrence are previously set by one directional link between the adjacent nodes as a unit, and the links defined with the labels to be used at the failure occurrence are connected together to thereby set the bypassing path, in cooperative with the failure notifying message sequentially transferred among nodes on the same directional ring at the failure occurrence, so that the management of the label table in each node can be easily performed even if the number of nodes on the rings is increased. Further, since the formation of the bypassing path and the verification of connectivity are performed only by circulating the failure notifying message among the respective nodes for one time, it is possible to reliably execute a protecting operation in a short time.

The object and advantages of the invention will be realized and attained by section of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a block diagram illustrating a configuration of one embodiment of a transmission apparatus;

FIG. 11 is a diagram for explaining an operation of an application example corresponding to the protection in a bidirectional switching system;

FIG. 15 is a block diagram illustrating a configuration of a transmission apparatus applied to a shared node in the application example of FIG. 14;

FIG. 17 is a block diagram illustrating a configuration of a transmission apparatus applied to each of the shared nodes in the network configuration of FIG. 16;

DESCRIPTION OF EMBODIMENTS

Figure 2:
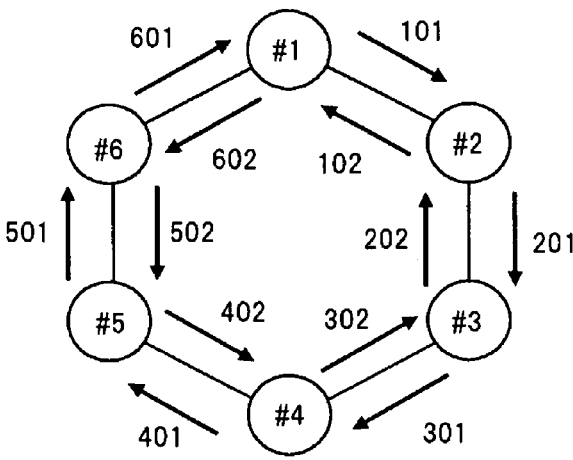
FIG. 2 is a diagram illustrating one example of labels set in an initial state in a ring network applied with the transmission apparatus in FIG. 1.

Hereinafter, embodiments of the present invention will be described with reference to drawings. The same reference numerals denote the same or equivalent parts in all drawings.

Figure 1:
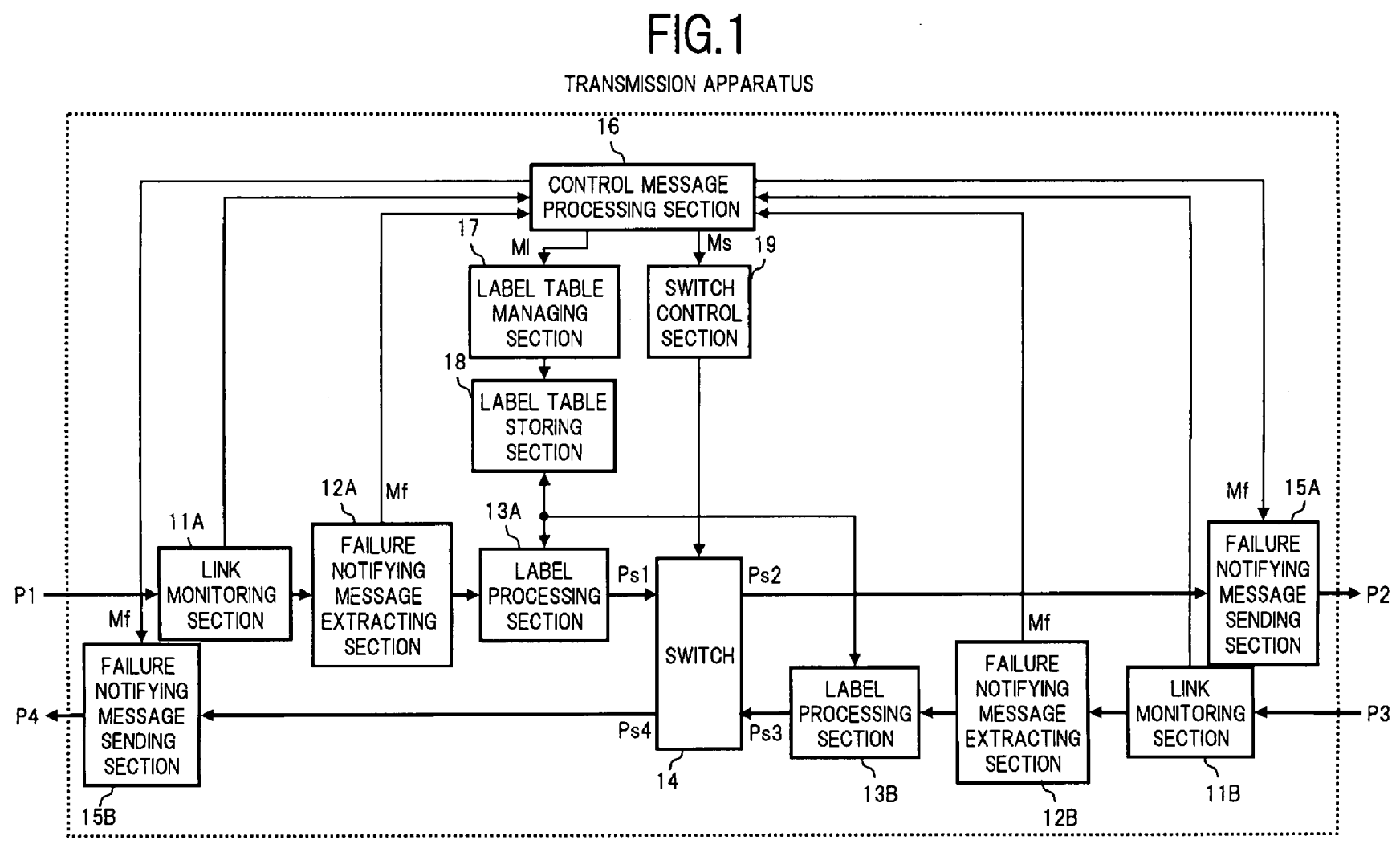

FIG. 1 is a block diagram illustrating a configuration of one embodiment of a transmission apparatus in the present invention. Further, FIGS. 2 to 5 are diagrams each for explaining a protection operation at the failure occurrence in a ring network to which the transmission apparatus in FIG. 1 is applied at each node.

In FIG. 1, the transmission apparatus in the present embodiment includes, for example, an input port P1 and an output port P2 which are connected to a clockwise ring of the ring network, and an input port P3 and an output port P4 which are connected to a counterclockwise ring thereof.

On a signal path between the input port P1 and the output port P2, a link monitoring section 11A, a failure notifying message extracting section 12A, a label processing section 13A, a switch 14 and a failure notifying message sending section 15A are arranged in this sequence. Further, also on a signal path between the input port P3 and the output port P4, a link monitoring section 11B, a failure notifying message extracting section 12B, a label processing section 13B, the switch 14 and a failure notifying message sending section 15B are arranged in this sequence. Incidentally, the switch 14 is disposed over the signal paths in respective directions.

The link monitoring section 11A monitors a state of an input signal to the input port P1, and detects whether or not a failure occurs in a transmission path (a link) connected to the input port P1 and whether or not the transmission path is restored from the failure, to transmit the detection results to a control message processing section 16. The link monitoring section 11B monitors a sate of an input signal to the input port P3, and detects whether or not a failure occurs in a transmission path (a link) connected to the input port P3 and whether or not the transmission path is restored from the failure, to transmit the detection results to the control message processing section 16. Herein, the link monitoring sections 11A and 11*b* function as failure detecting section. When the failure occurrence is detected by either the link monitoring section 11A or the link monitoring section 11B, the control message processing section 16 generates a failure notifying massage Mf and a switch change-over message Ms. The failure notifying message Mf is sent out onto the ring in the same direction via the failure notifying message sending section 15 on side at which the failure occurs, so that the failure occurrence in the upstream link is sequentially notified to each downstream node. The switch change-over message Ms is output to a switch control section 19, and a state of the switch 14 is changed-over so that the ring is turned back at the node adjacent to a failed block. Further, when the restoration from the failure is detected by either the link monitoring section 11A or the link monitoring section 11B, the control message processing section 16 stops the failure notifying message Mf which has been continuously output during the failure occurrence, and also, outputs the switch change-over message Ms to the switch control section 19. In accordance with the switch change-over message Ms, the switch 14 is changed-over to the state before the failure occurrence. Incidentally, herein, the failure notifying message Mf is stopped when the transmission path is restored from the failure. However, the configuration may be such that the failure notifying message is sent out when the failure occurrence is detected, and when restoration from the failure is detected, a failure restoration message different from the failure notifying message is sent out.

The failure notifying message extracting section 12A extracts the failure notifying message Mf sent out from the upstream node, from the signal input thereto from the input port P1 through the link monitoring section 11A, to output the extracted failure notifying message Mf to the control message processing section 16. The failure notifying message extracting section 12B extracts the failure notifying message Mf sent out from the upstream node, from the signal input thereto from the input port P3 through the link monitoring section 11B, to output the extracted failure notifying message Mf to the control message processing section 16. When the failure notifying message Mf is sent from either the failure notifying message extracting section 12A or the failure notifying message extracting section 12B, the control message processing section 16 outputs a label processing message M1 instructing the execution of label binding processing (to be described later) to a label table managing section 17. The label table managing section 17 receives the label processing message M1 from the control message processing section 16, to update a label table stored in a label table storing section 18. Note, the details of label table update processing by the label table managing section 17 will be described later.

The label processing section 13A executes required label switching processing on the signal (packet) input thereto from the input port P1 through the link monitoring section 11A and the failure notifying message extracting section 12A, in accordance with the label table stored in the label table storing section 18. The label processing section 13B executes required label switching processing on the signal (packet) input thereto from the input port P3 through the link monitoring section 11B and the failure notifying message extracting section 12B, in accordance with the label table stored in the label table storing section 18. For this label switching processing, similar to processing generally executed in MPLS or the like, there are: processing (Push) of adding a label to the packet at the node positioned on a starting point to forward the label added packet; processing (Swap) of replacing the label of the packet at the intermediate node to forward the label replaced packet; processing (Pop) of removing the label of the packet at the node positioned on a termination point to forward the label removed packet and the like, on a path for the label added packet (Label Switched Path: LSP).

The switch 14 includes, herein, two input ports Ps1 and Ps3, and two output ports Ps2 and Ps4. Output ends of the label processing sections 13A and 13B are respectively connected to the input ports Ps1 and Ps3, and input ends of the failure notifying message sending sections 15A and 15B are respectively connected to the output ports Ps2 and Ps4. In the switch 14, a connection state between the input and output ports is changed-over in accordance with a control signal from the switch control section 19.

Next, there will be described the protection operation at the failure occurrence in the ring network to which the transmission apparatus of the above configuration is applied to each node. Herein, the description will be made on the assumption that six nodes are arranged on the rings as exemplarily illustrated in FIG. 2 and the like. However, the number of nodes on the rings is not limited to the above example.

Firstly, in an initial state before the operation start illustrated in FIG. 2, by one directional transmission paths (links) respectively connecting nodes #1 to #6 as a unit, the labels to be used at the failure occurrence are individually set to the links in respective directions among all the nodes. The set labels to be used at the failure occurrence are registered in the label table managing section 17 in each node. Herein, for example, the label for the clockwise link between the nodes #1 and #2 is set at 101 and the label for the counterclockwise link between the nodes #1 and #2 is set at 102. Further, the label for the clockwise link between the nodes #2 and #3 is set at 201 and the label for the counterclockwise link between the nodes #2 and #3 is set at 202. Furthermore, the label for the clockwise link between the nodes #3 and #4 is set at 301 and the label for the counterclockwise link between the nodes #3 and #4 is set at 302. Still further, the label for the clockwise link between the nodes #4 and #5 is set at 401 and the label for the counterclockwise link between the nodes #4 and #5 is set at 402. Even still further, the label for the clockwise link between the nodes #5 and #6 is set at 501 and the label for the counterclockwise link between the nodes #5 and #6 is set at 502. Moreover, the label for the clockwise link between the nodes #6 and #1 is set at 601 and the label for the counterclockwise link between the nodes #6 and #1 is set at 602. In the following description, paths defined by the above labels may be called link paths.

However, the above respective labels 101, 102, . . . , 601, 602 are only allocated to the respective links in a normal operation state where the failure does not occur, and accordingly, are not used as labels for mapping to transmit user data (packet). Namely, as described later in detail, the respective labels 101, 102, . . . , 601, 602 are previously defined on the link basis for forming a path bypassing the failed block at the failure occurrence.

Figure 3:
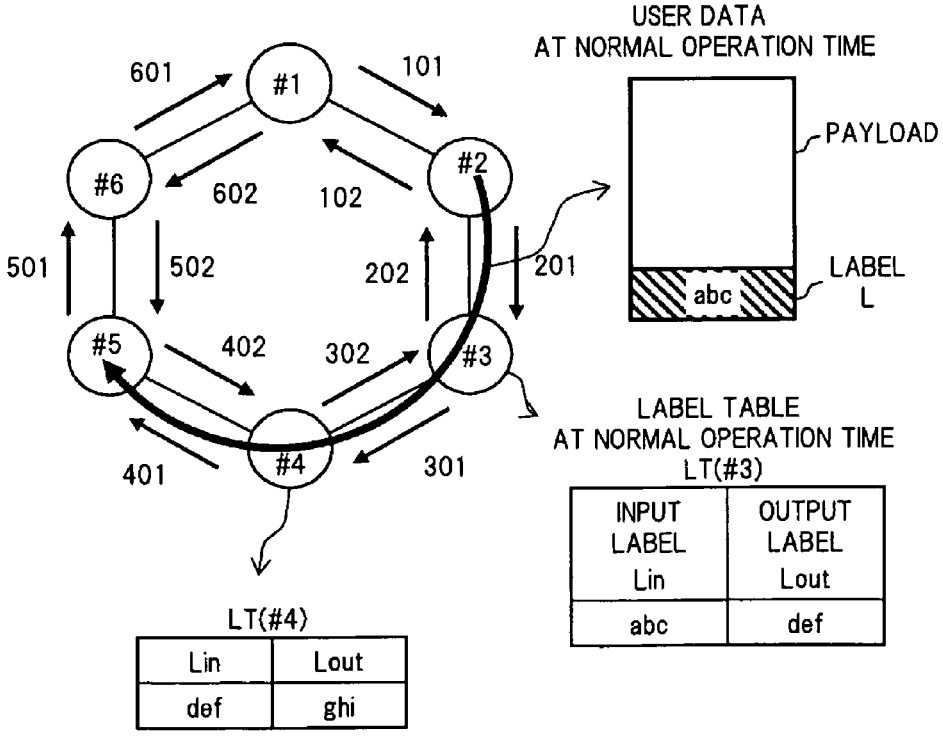
FIG. 3 is a diagram for explaining an operation in a normal operation time in the embodiment.

Incidentally, as exemplarily illustrated in FIG. 3, for transmitting the user data in the normal operation time, labels different form the labels 101, 102, . . . , 601, 602 set in FIG. 2 are used. To be specific, in the example of FIG. 3, when the user data is transmitted in clockwise from the node #2 to the node #5, the user data added with a label "abc" in the node #2 is sent to the node #3. In the node #3, in accordance with a label table LT(#3) in the normal operation time, the label "abc" of the user data from the node #2 is replaced with a label "def", and the user data added with the label "def" is sent to the node #4. Further, also in the node #4, in accordance with a label table LT(#4) in the normal operation time, the label "def" of the user data from the node #3 is replaced with a label "ghi", and the user data added with the label "ghi" is sent to the node #5. Then, in the node #5, the label "ghi" is removed from the user data from the node #4, so that the user data is terminated.

Figure 4:
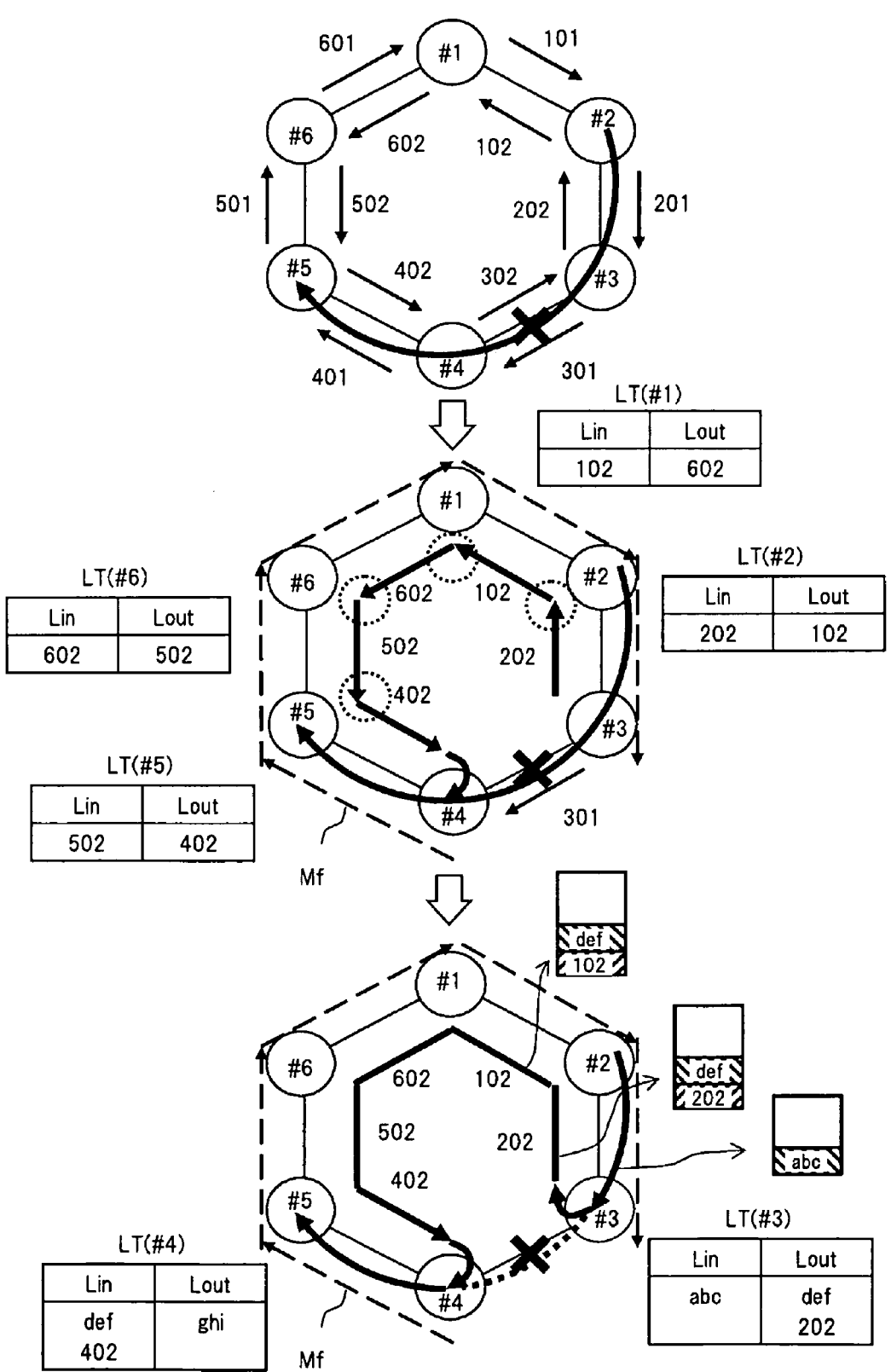
FIG. 4 is a diagram for explaining an operation at the link failure occurrence in the embodiment.

Next, as illustrated in FIG. 4 for example, there will be described the protection operation for when the failure occurs in the transmission path (link) corresponding to the clockwise ring between the nodes #3 and #4. In this case, in the node #4, the link monitoring section 11A detects the failure occurrence based on that the input signal from the node #3 is not transmitted to the node #4. Then, in the control message processing section 16 received the detection result by the link monitoring section 11A, the failure notifying message Mf is generated. This failure notifying message Mf is sent out onto the clockwise ring via the failure notifying message sending section 15A, and is sequentially transferred by each node positioned on the downstream of the node #4, to thereby be terminated at the node #3 (a broken line arrow in the middle stage of FIG. 4). Incidentally, it is assumed that the node #3 is directly notified from the node #4 via the link in the direction opposite to the failed link that the signal transmission from the node #3 to the node #4 is unable, to judge the termination of the failure notifying message Mf at the own node.

Further, in the control message processing section 16 of the node #4, the switch change-over message Ms is generated together with the failure notifying message Mf, to be output to the switch control section 19. Thus, the connection state between the input and output ports of the switch 14 in the node #4 is changed-over so that the input port Ps3 which is input with the signal from the counterclockwise ring is connected to the output port Ps2 which outputs the signal onto the clockwise ring.

In each node on the downstream of the node #4, when the failure notifying message Mf sent out onto the clockwise ring from the node #4 is extracted by the failure notifying message extracting section 12A, the label processing message M1 instructing the label binding processing is output to the label table managing section 17 from the control message processing section 16. In the label table managing section 17, when the label processing message M1 is received, processing of connecting together the link paths adjacent to the own node on the counterclockwise ring side (dotted circular line in the middle stage of FIG. 4) is performed among the paths (FIG. 2) previously allocated with the labels on the link basis.

To be specific, in the node #5 which firstly receives the failure notifying message Mf from the node #4, a label table LT(#5) for, when the packet added with the label 502 is input from the counterclockwise ring side, replacing the label 502 of the packet with the label 402 to forward the packet added with the label 402 is created by the label table managing section 17 to be stored in the label table storing section 18. Similarly to this, in the node #6, a label table LT(#6) for replacing the input label 602 with the output label 502 is created to be stored; in the node #1, a label table LT(#1) for replacing the input label 102 with the output label 602 is created to be stored; and in the node #2, a label table LT(#2) for replacing the input label 202 to the output label 102 is created to be stored.

In the node #3 which finally receives the failure notifying message Mf from the node #4, the switch change-over message Ms for turning back the ring is output to the switch control section 19 from the control message processing section 16. Thus, the connection state between the input and output ports of the switch 14 in the node #3 is changed-over so that the input port Ps1 which is input with the signal from the clockwise ring is connected to the output port Ps4 which outputs the signal onto the counterclockwise ring. Further, in the node #3, the label processing message M1 for rewriting the label table in the normal operation time to that corresponding to the path turning back the ring is output to the label table managing section 17 from the control message processing section 16. Thus, a label table LT(#3) for, when the packet added with the label "abc" is input from the clockwise ring side, replacing the label "abc" with the label "def" in the same way as in the normal operation time to stack the label "def" on the label 202 added in advance of the replacement is created by the label table managing section 17 to be stored in the label table storing section 18 (the right side in the lower stage of FIG. 4).

Incidentally, in the node #4 facing the node #3 with the failed block therebetween, after the failure notifying message Mf is sent out, the message M1 instructing the rewriting of the label table is output to the label table managing section 17 from the control message processing section 16. In the label table managing section 17 of the node #4, a label table LT(#4) for, when the packet added with the label 402 is input from the counterclockwise ring side, removing the label 402, and also, replacing the stacked label "def" with the label "ghi" in the same way as in the normal operation time is created to be stored in the label table storing section 18 (the left side in the lower stage of FIG. 4).

According to a series of processing as described above, the bypassing path is formed by sequentially connecting the label paths for bypassing the failure occurred in the link between the nodes #3 and #4, namely, link paths defined by the labels 202, 102, 602, 502 and 402. Thus, when the packet added with the label "abc" in the node #2 is output from the output port P2 of the node #2 to be input to the input port P1 of the adjacent node #3, in the label processing section 13A of the node #3, in accordance with the label table LT(#3) stored in the label table storing section 18, the label "abc" of the input packet is replaced with the label "def", to be stacked on the label 202 added in advance of the replacement. The packed added with the label 202 is turned back to the counterclockwise ring side by the switch 14, to be output toward the node #2 from the output port P4.

When the packet added with the label 202 is input to the input port P3 of the node #2, in the label processing section 13B of the node #2, in accordance with the label table LT(#2) stored in the label table storing section 18, the label 202 of the input packet is replaced with the label 102. The packet added with the label 102 passes through the switch 14 to be output toward the node #1 from the output port P4. Similarly to this, the replacement of the label 102 to the label 602 in the node #1, the replacement of the label 602 to the label 502 in the node #6 and the replacement of the label 502 to the label 402 in the node #5 are sequentially performed.

When the packet added with the label 402 is output from the output P4 of the node #5 to be input to the input port P3 of the adjacent node #4, in the label processing section 13B of the node #4, in accordance with the label table LT(#4) stored in the label table storing section 18, the label 402 of the input packet is removed, and also, the stacked label "def" is replaced with the label "ghi". The packet added with the label "ghi" is turned back to the clockwise ring side by the switch 14, to be output toward the node #5 from the output port P2. Then, when the packet added with the label "ghi" is input to the input port P1 of the node #5, the label "ghi" is removed by the label processing section 13A, and the packet is terminated.

Next, there will be described the operation at the failure restoration time referring to FIG. 5.

Figure 5:
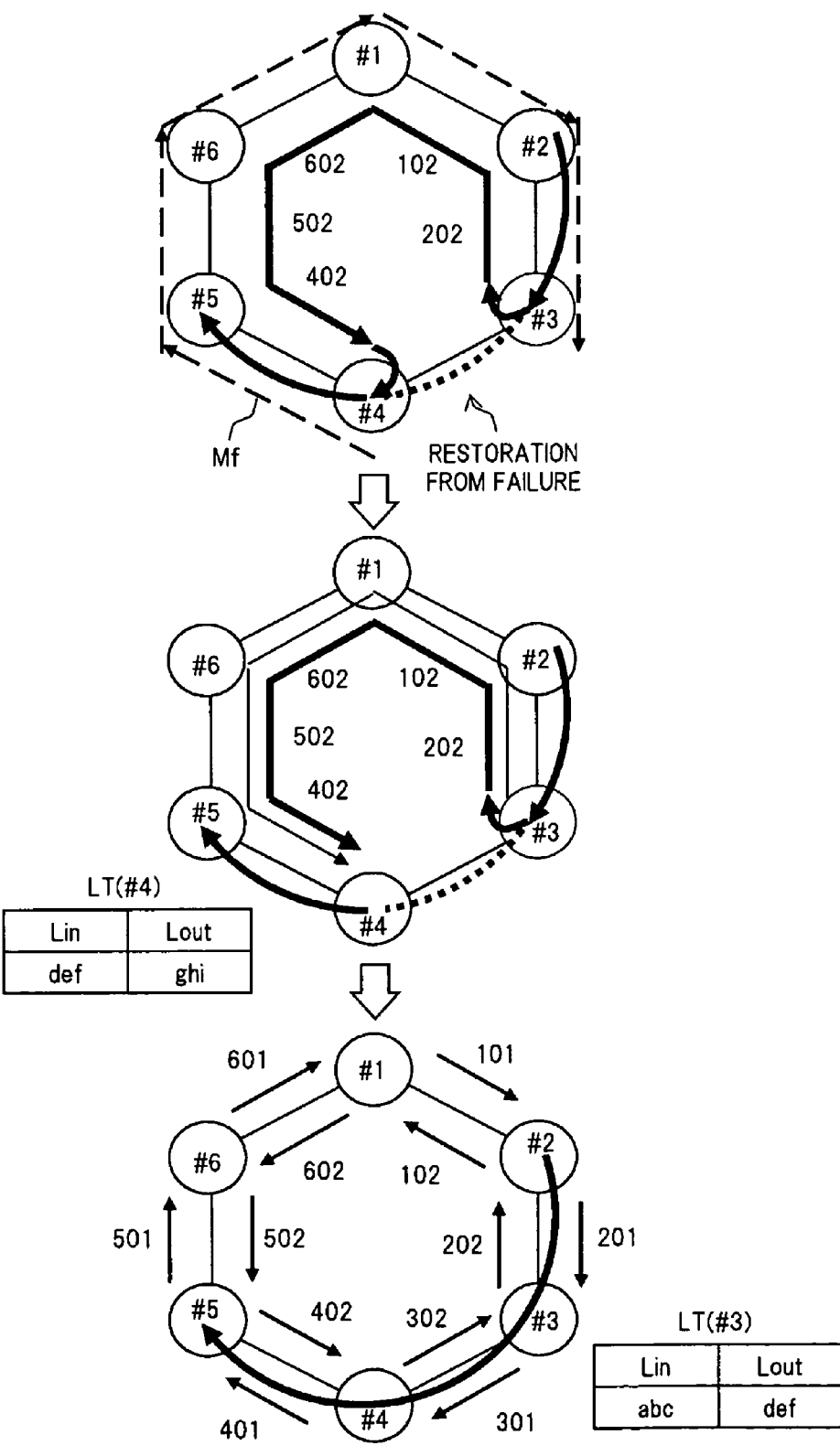
FIG. 5 is a diagram for explaining an operation at the link failure restoration in the embodiment.

As illustrated in the upper stage of FIG. 5, when the failure occurred in the link between the nodes #3 and #4 is restored, such restoration is detected by the link monitoring section 11A of the node #4 to be transmitted to the control message processing section 16. In the control message processing section 16 received the failure restoration from the link monitoring section 11A, the failure notifying message Mf which has been continuously sent out toward the node #3 via the clockwise ring during the failure occurrence is stopped. Further, the switch change-over message Ms for returning the switch 15 to the original state (the state in the normal operation time) is generated to be output to the switch control section 19, and also, the label processing message M1 for rewriting the label table LT(#4) stored in the label table storing section 18 to that for the normal operation time is generated to be output to the label table managing section 17. Thus, as illustrated in the middle stage of FIG. 5, the connection state between the input and output ports of the switch 14 in the node #4 is changed-over so that the input ports Ps1 and Ps2 corresponding to the clockwise ring are connected to each other. Further, the label table LT(#4) is updated so as to, when the packet added with the label "def" is input from the clockwise ring side, replace the label "def" of the packet with the label "ghi" to thereby forward the packet added with the label "ghi".

In each node on the downstream of the node #4, when the failure notifying message Mf is not extracted by the failure notifying message extracting section 12A, the failure restoration is judged by the control message processing section 16. Then, in the control message processing section 16 in each of the nodes #5, #6, #1 and #2, the label processing message MI for releasing the label binding at the failure occurrence is output to the label table managing section 17. Thus, the label table LT stored in the label table storing section 18 in each of the nodes #5, #6, #1 and #2 is rewritten to that for the normal operation time corresponding to the state illustrated in the upper stage of FIG. 4.

Further, in the control message processing section 16 of the node #3, the switch change-over message Ms for returning the switch 14 to the state in the normal operation time is generated to be output to the switch control section 19, and also, the message M1 for rewriting the label table LT(#3) stored in the label table storing section 18 to that for the normal operation time is generated to be output to the label table managing section 17. Thus, the connection state between the input and output ports of the switch 14 in the node #3 is changed-over so that the input ports Ps1 and Ps2 corresponding to the clockwise ring are connected to each other. Further, the label table LT(#3) is updated so as to, when the packet added with the label "abc" is input from the clockwise ring side, replace the label "abc" of the packet with the label "def" to thereby forwarded the packed added with the label "def" (the lower stage of FIG. 5).

According to a series of processing at the failure restoration time as described above, when the packet added with the label "abc" in the node #2 is output from the output port P2 of the node #2 to be input to the input port P1 of the adjacent node #3, in the label processing section 13A of the node #3, in accordance with the label table LT(#3) stored in the label table storing section 18, the label "abc" of the input packet is replaced with the label "def", to be output toward the node #4 from the output port P2. Further, similarly to this, also in the node #4, the label "def" of the input packet is replaced with the label "ghi". Then, in the node #5, the label "ghi" of the packet from the node #4 is removed and the packet is terminated.

As described above, according to the transmission apparatus in the present embodiment, focusing on the network configuration called the ring form, the labels to be used at the failure occurrence are previously set by the link between the adjacent nodes as a unit, and the bypassing path is formed by connecting together the link paths in cooperative with the failure notifying message Mf sequentially transferred among the respective nodes at the failure occurrence, so that even if the number of nodes on the rings is increased, the management of the label table in each node can be easily performed. To be specific, in each node on the rings, the matching of the four labels, (for example, the labels 101, 102, 201 and 202 in the node #2) for forming the bypassing path corresponding to the failure occurrence at an arbitrary position may only be managed. Further, since the formation of the bypassing path and the connection verification are performed only by circulating by one time the failure notifying message Mf among each node, it is possible to reliably execute the protection operation in a short time.

Figure 6:
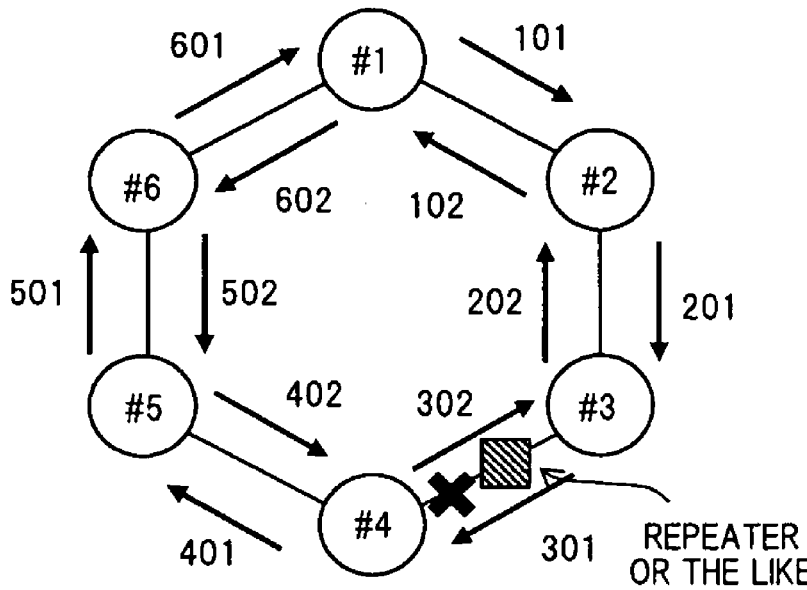
FIG. 6 is a diagram illustrating a modified example in which a failure notifying message containing label information of a failed block is transferred, relating to the operation in FIG. 4.
Figure 6:
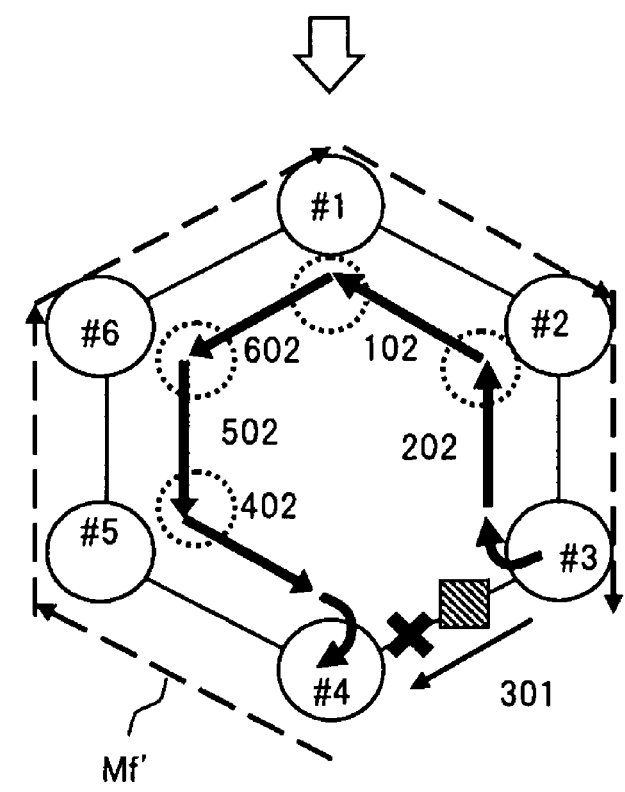

Incidentally, in the above embodiment, the description has been made, on the provision that it is directly notified from the node #4 to the node #3 via the links in the opposite direction that the signal transmission from the node #3 to the node #4 is unable, and the failure notifying message Mf sent out from the node #4 is terminated at the node #3. However, as illustrated in FIG. 6 for example, when a repeater or the like is inserted between the nodes #3 and #4, there is a possibility that the above provision cannot be established. If there is no notifying means from the links in the opposite direction in such a failed block, it is preferable that the failure notifying message sent out from the node #4 to each downstream node contains information (in the example of FIG. 6, the label 301) corresponding to the link at which the failure occurs. The node #3 received such a failure notifying message Mf can judge that the own node is nearest to the failed block, to reliably terminate the failure notifying message Mf.

Figure 7:
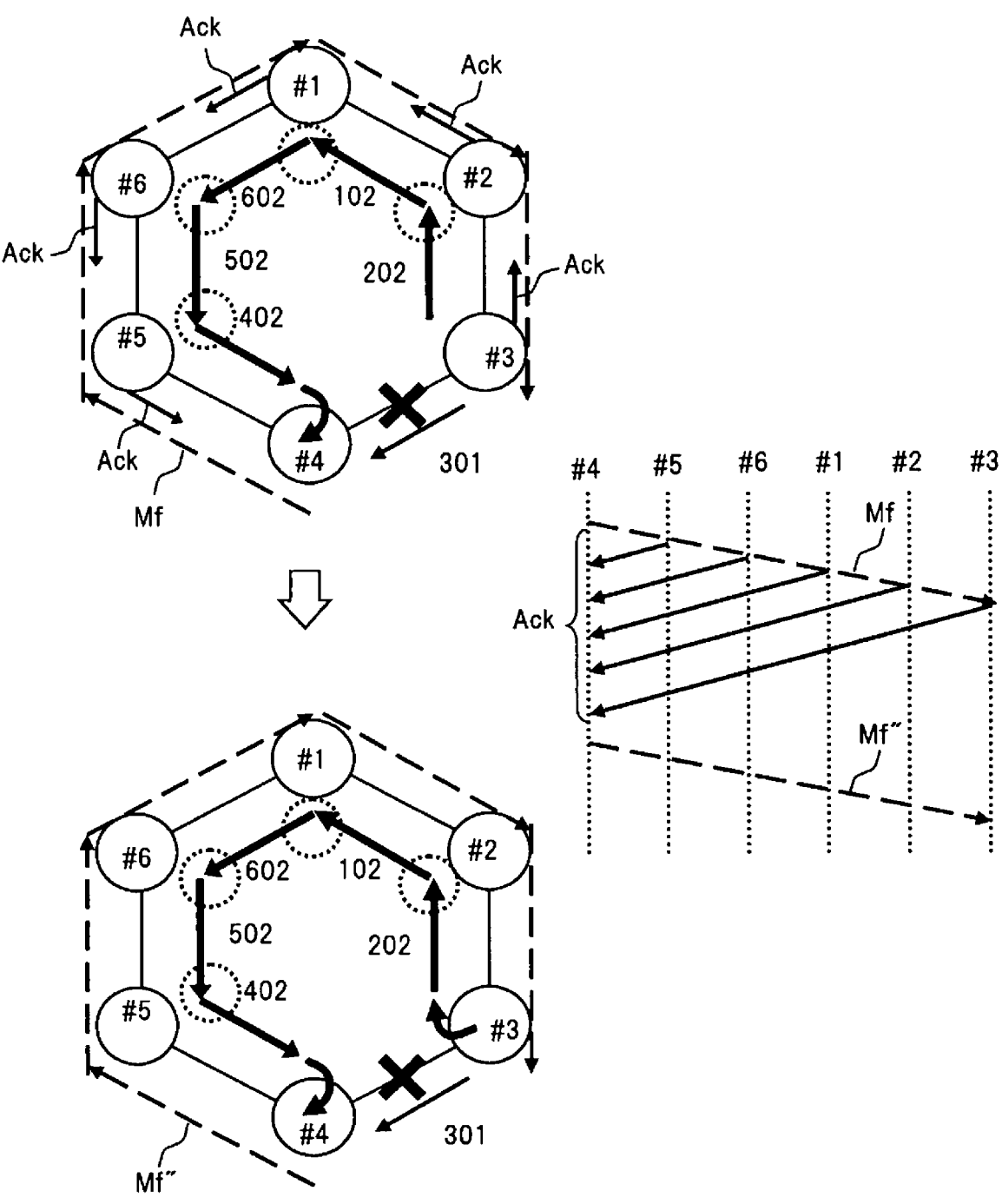
FIG. 7 is a diagram illustrating a modified example in which the reception of the failure notifying message and the response thereto are performed, relating to the operation in FIG. 4.

Or, as an approach different from the above, as illustrated in FIG. 7 for example, the configuration may be such that each node received the failure notifying message Mf from the node #4 responses a so-called Ack (Acknowledge) signal to the node #4, and when the node #4 verifies a response of the Ack signal from each node in a certain time to judge that the node #3 is farthest from the own node, the node #4 resends the failure notifying message Mf' to the node #3. Thus, it becomes possible that the node #3 receives the failure notifying message Mf' resent to the own node to perform the label table processing and the switch changing-over corresponding to the terminal node.

Further, in the above embodiment, one example has been illustrated in which the labels 101, 102 and the like are set on the bidirectional links between the adjacent nodes. However, the method of label setting in the present invention is not limited thereto. For example, in the network using MPL defined by RFC3031 and RFC3021, there is a label allocating system prescribed by LDP(RFC3036) or RSVP-TE (RFC3209). In order to apply this label allocating system to the formation of link path between the adjacent nodes in the above embodiment, an IP address may be locally assigned between the adjacent nodes. Furthermore, even at the failure occurrence, since the nodes nearest the failed block can continue to maintain an adjacent relation therebetween via the bypassing path, the connectivity on the IP and the label allocating system can be held. Moreover, also for the labels bounded at the failure occurrence, by separately continuing to maintain only a connection verifying message between the adjacent nodes, it is possible to hold the label allocating system.

Further, in the above embodiment, the description has been made on the case where the failure occurs in the transmission path (link) connecting the nodes. However, the present invention can cope with the case where the failure occurs in the node. Herein, as illustrated in the upper stage and the like of FIG. 8, assuming a situation where when the user data is transmitted from the node #2 to the node #6 via the clockwise ring, the failure occurs in the node #4 so that the signal cannot be transmitted in a block of #3 → #4 → #5, the protection operation at that time will be specifically described. In this regard, it is preconditions that the node #3 understands the failed block, namely, the node #3 is notified that the own node is a starting node of the failed block.

Figure 8:
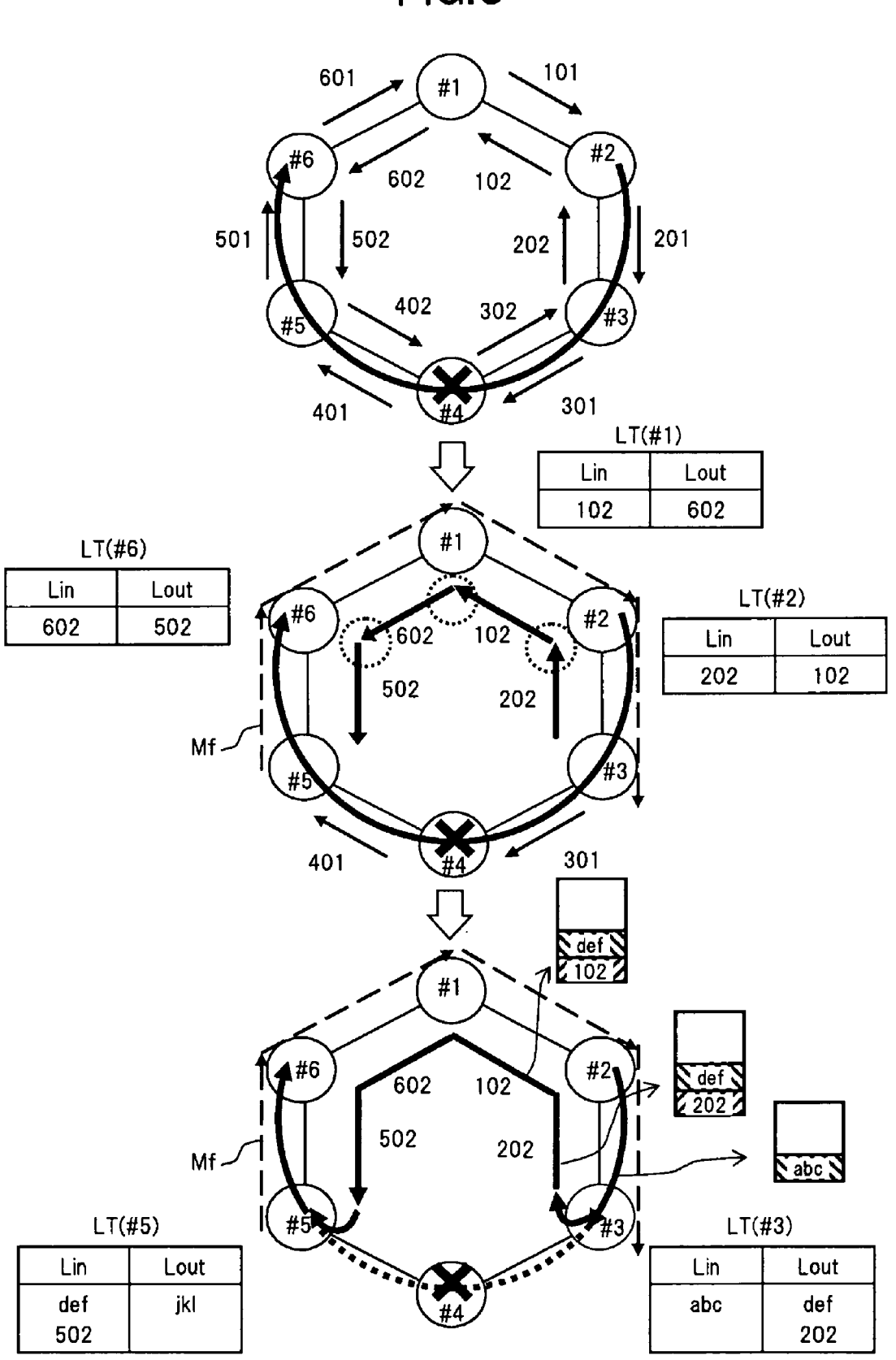
FIG. 8 is a diagram for explaining an operation at the node failure occurrence in the embodiment.

In this case, as illustrated in the middle stage of FIG. 8, the signal is not input to the node #5 due to the failure occurrence in the node #4, so that the failure occurrence is detected by the link monitoring section 11A of the node #5. By the failure detection in the node #5, similarly to the above embodiment, the failure notifying message Mf is sent out onto the clockwise ring from the node #5, and is sequentially transferred to each of the downstream nodes #6, #1, and #2, to be terminated in the node #3. Then, the label binding processing is executed in each of the nodes #6, #1 and #2, which received the failure notifying message Mf, and the switch changing-over processing of the switch and the label table rewiring processing are performed in each of the nodes #3 and #5.

However, in the label table rewiring processing in the node #5, the label table LT(#5) for, when the packet added with the label 502 is input from the counterclockwise ring side, removing the label 502, and also, replacing the stacked label "def" with a label "jkl" is created to be stored (the left side in the lower stage of FIG. 8). This label "jkl" is a label to be added to the packet sent from the node #5 to the node #6 in the normal operation time. The node #5 understands the failure occurrence in the node #4, or the node #5 understands the input label indicated by signaling or the like, so that changing of the replacement of the label "ghi" with the label "jkl" in the normal operation time to the replacement of the label "def" with the label "jkl" is previously set. By the above described processing, the bypassing path corresponding to the node failure is formed.

Figure 9:
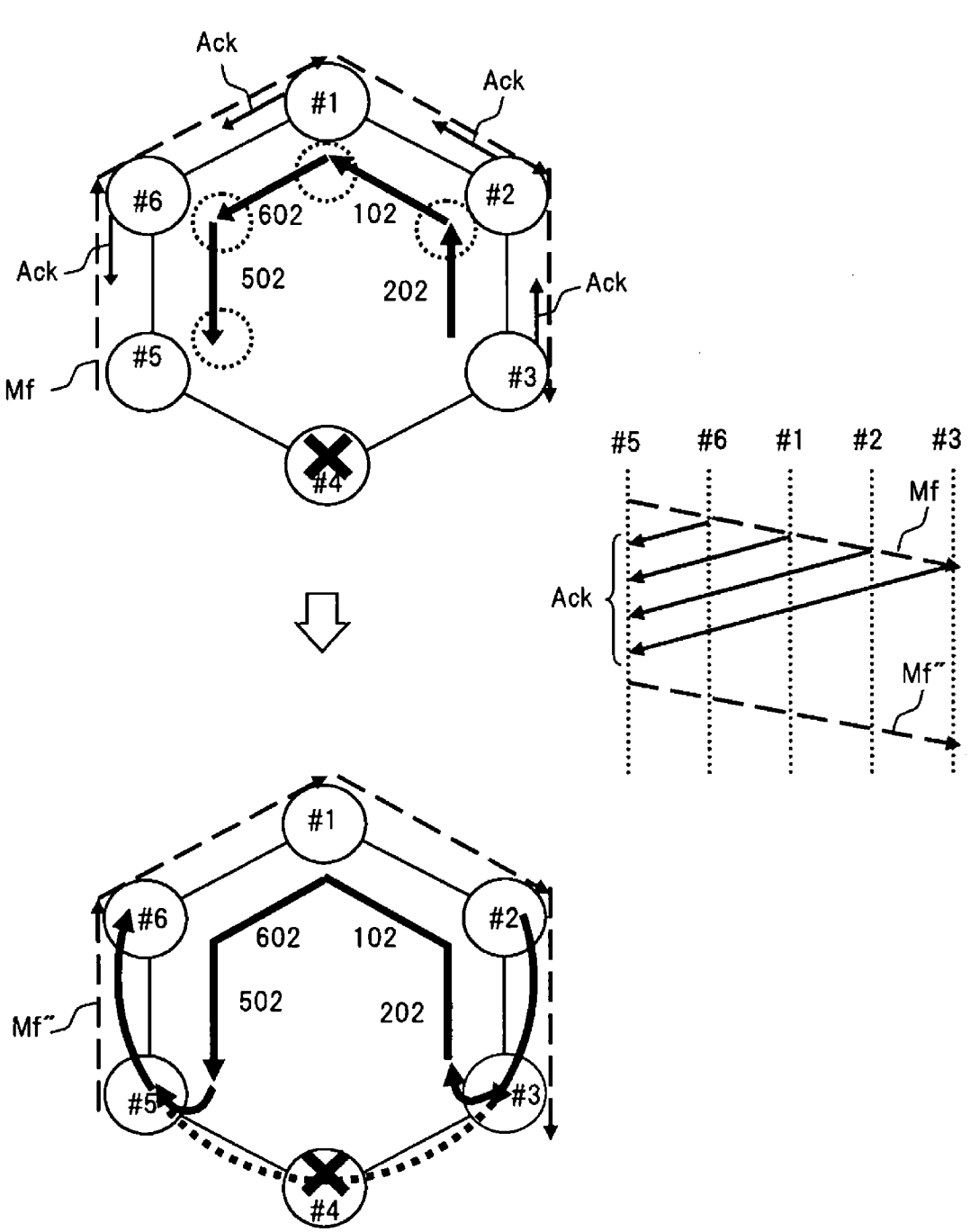
FIG. 9 is a diagram illustrating a modified example in which the reception of the failure notifying message and the response thereto are performed to, relating to the operation in FIG. 8.

Incidentally, also in the protection operation the node failure occurrence as described above, as illustrated in FIG. 9, the configuration may be such that each node received the failure notifying message Mf from the node #5 responses the Ack signal to the node #5, and the node #5 judges that the node #3 is farthest from the own node, to resend the failure notifying message Mf to the node #3.

Figure 10:
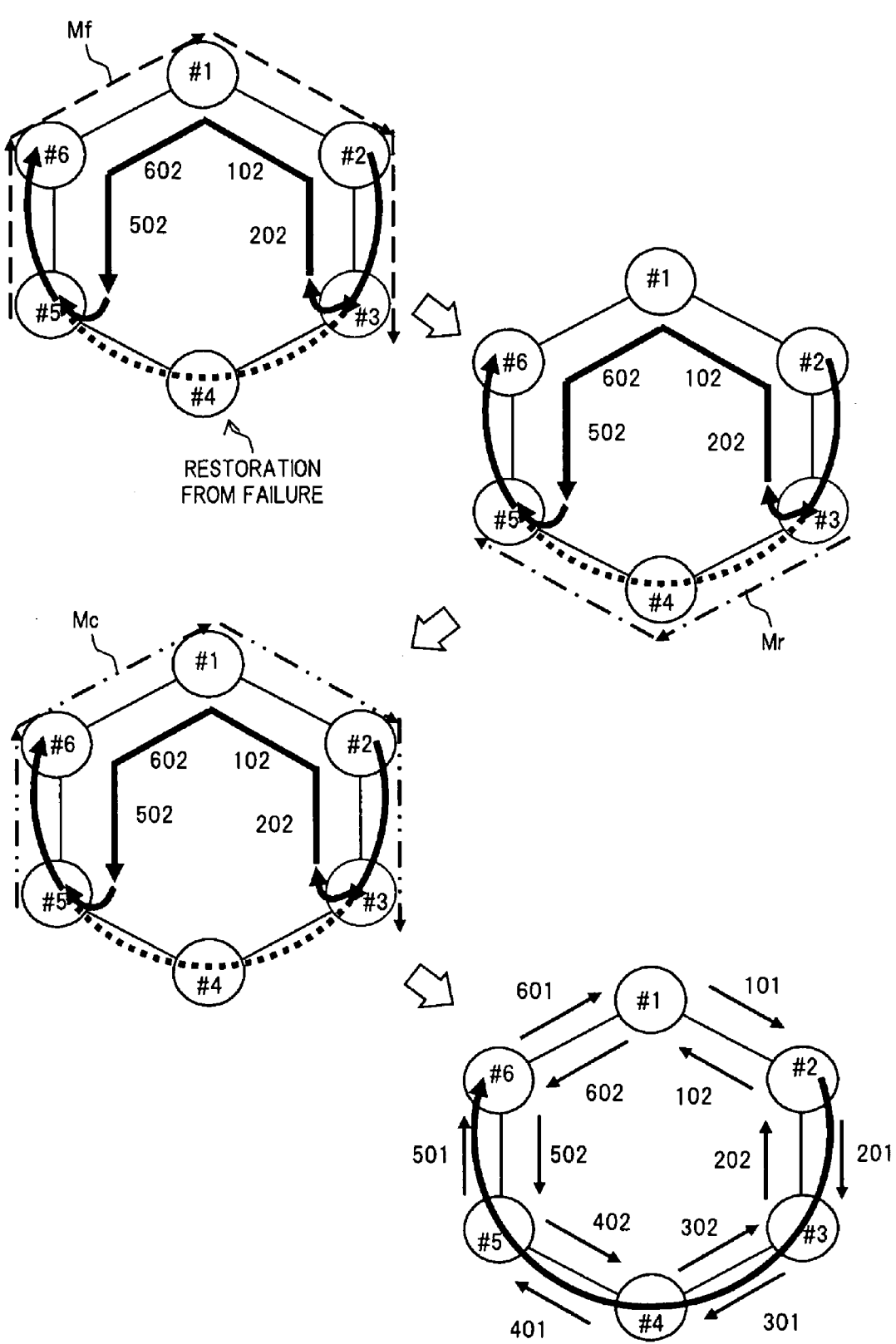
FIG. 10 is a diagram for explaining an operation at the node failure restoration in the embodiment.

As illustrated in FIG. 10 for example, when the node #4 is restored from the failure, such restoration is detected in the node #5, and the failure notifying message Mf which has been sent out to the downstream nodes is stopped (the upper left side of FIG. 10). When the stopping of the failure notifying message Mf is detected in the node #3, a restoration notifying message Mr is sent out toward the node #5 from the node #3 (the upper right side of FIG. 10). When the restoration notifying message Mr is detected in the node #5, a ring conduction message Mc is sent out toward the downstream nodes from the node #5 (the lower left side of FIG. 10). Then, in each of the nodes #6, #1 and #2 which received the ring conduction message Mc, the processing of releasing the label binding at the failure occurrence is executed. Further, in the nodes #3 and #5, the processing of returning the switch 14 to the state in the normal operation time is performed, and also, the processing of rewriting the label table LT to that for the normal operation time is executed (the lower right side of FIG. 10).

Incidentally, in the case where the restoration notifying message Mr sent out from the node #3 is not detected in the node #5, if the restoration notifying message Mr is detected in the node #4, it is judged that, after the node #4 is restored from the failure, the failure occurs in the link between the nodes #4 and #5. Further, if the restoration notifying message Mr is not detected in the node #4, it is judged that failure occurs in the link between the nodes #3 and #4. In the former case, the failure notifying message Mf is resent from the node #5, and in the latter case, the failure notifying message Mf is sent out from the node #4, so that a new bypassing path is formed by a protection operation similar to that at the above rink failure occurrence.

However, the present protection system cannot cope with the case where the node failure or the link failure as described above occurs simultaneously in two or more sites. Therefore, in such a case, it is desirable that a label binding releasing message is sent out from the nodes adjacent to the failed blocks to the remaining nodes, to thereby release the label binding which has formed the bypassing path.

Next, there will be described an application example of the above embodiment.

The protection operation in the above embodiment is the one directional changing-over system which, when the failure occurs in one (the clockwise ring) of the bidirectional rings, passes the user data transmitted through the failed ring to the bypassing path to relieve it. However, the configuration example of the transmission apparatus illustrated in FIG. 1 can cope with a protection operation in a bidirectional changing-over system which, when the failure occurs in one of the rings, passes simultaneously the user data transmitted through the failed ring and the user data transmitted through the counterclockwise ring to relieve them. In the followings, there will be described the protection operation in the bidirectional changing-over system referring to FIG. 11.

Herein, similar to FIG. 4 for example, it is assumed the case where the failure occurs in the transmission path (link) between the nodes #3 and #4 corresponding to the clockwise ring (the upper stage of FIG. 11). In this case, when the failure occurrence is detected by the link monitoring section 11A of the node #4 and the detection result is transmitted to the control message processing section 16, the failure notifying message Mf generated by the control message processing section 16 is sent out onto the clockwise ring via the failure notifying message sending section 15. This failure notifying message Mf is sequentially transferred to each node positioned on the downstream of the node #4, to be terminated in the node #3 (a broken line arrow in the middle stage of FIG. 11).

In each node downstream of the node #4, when the failure notifying message Mf is received, the message M1 instructing the label binding processing corresponding to the clockwise ring as well as the counterclockwise ring is output from the control message processing section 16 to the label table managing section 17. In the label table managing section 17, when the label binding message M1 is received, for the paths to which the labels are previously allocated on the link basis, the counterclockwise ring side link paths adjacent to the own node are connected together, and the processing of connecting together the clockwise ring side link paths adjacent to the own node is performed (a broken circular line in the middle stage of FIG. 11).

To be specific, in the node #5 which firstly receives the failure notifying message Mf from the node #4, the label table LT(#5) for, when the packet added with the label 502 is input from the counterclockwise ring side, replacing the label 502 of the packet with the label 402 to forward the packet added with the label 402, and also, for when the packet added with the label 401 is input from the clockwise ring side, replacing the label 401 of the packet with the label

501 to forward the packet added with the label 501, is created by the label table managing section 17 to be stored in the label table storing section 18. Similarly to this, in the node #6, the label table LT(#6) for replacing the input label 602 with the output label 502 and also replacing the input label 501 with the output label 601 is created to be stored. Further, in the node #1, the label table LT(#1) for replacing the input label 102 with the output label 602 and also replacing the input label 601 with the output label 101 is created to be stored. Furthermore, in the node #2, the label table LT(#2) for replacing the input label 202 with the output label 102 and also replacing the input label 101 with the output label 201 is created to be stored.

In the node #3 which finally receives the failure notifying message Mf from the node #4, the label table LT(#3) for, when the packet added with the label "abc" is input from the clockwise ring side, replacing the label "abc" of the packet with the label "def" as in the normal operation time to stack the label "def" on the label 202 added in advance of the replacement, and also, for, when the packet added with the label 201 is input from the clockwise ring side, removing the label 201 to replace a stacked label "DEF" with a label "ABC" as in the normal operation time is created to be stored. Incidentally, it is provided that the packet to be transmitted from the node #5 to the node #2 on the counterclockwise ring in the normal operation time is added with a label "GHI" in the node #5, and the label "GHI" is replaced with the label "DEF" in the node #4, and further, the label "DEF" is replaced with the label "ABC" in the node #3, and finally, the label "ABC" is removed in the node #2 so that the packet is terminated. Further, the connection state between the input and output ports of the switch 14 in the node #3 is changed-over so that the input port Ps1 and the output port Ps4 are connected to each other and the input port Ps3 and the output port Ps2 are connected to each other.

In the node #4 which sent out the failure notifying message Mf, the label table LT(#4) for, when the packet added with the label 402 is input from the counterclockwise ring side, removing the label 402 and replacing the stacked label "def" with the label "ghi" as in the normal operation time, and further, for, when the packet added with the label "GHI" is input from the clockwise ring side, replacing the label "GHI" of the packet with the label "DEF" as in the normal operation time to stack the label "DEF" on the label 401 added in advance of the replacement, is created to be stored. In addition, the connection state between the input and output ports of the switch 14 in the node #4 is changed-over so that the input port Ps1 and the output port Ps4 are connected to each other and the input port Ps3 and the output port Ps2 are connected to each other.

According to a series of processing as described above, the bidirectional label paths for bypassing the failure in the link between the nodes #3 and #4 are formed (the lower stage of FIG. 11). Thus, the packet to be transmitted from the node #2 to the node #5 is added with the label "abc" in the node #2, and in the node #3, the label "abc" is replaced with the label "def" which is stacked on the label 202 added to the packet in advance of the replacement, so that the packet is turned back to the counterclockwise bypassing path. Then, the label 202 is sequentially replaced with the label 102 → the label 602 → the label 502 → the label 402 in the nodes #2, #1, #6 and #5, and in the node #4, the label 402 is removed and also the stacked label "def" is replaced with the label "ghi" so that the packet is turned back onto the clockwise ring, and further, in the node #5, the label "ghi" is removed so that the packet is terminated. Further, the packet to be transmitted from the node #5 to the node #2 oppositely from the above packet, is added with the label "GHI" in the node #5, and in the node #4, the label "GHI" is replaced with the label "DEF" which is stacked on the label 402 added to the packet in advance of the replacement, so that the packet is turned back to the clockwise bypassing path. Then, the label 401 is sequentially replaced with the label 501 → the label 601 → the label 101 → the label 201 in the nodes #5, #6, #1 and #2, and in the node #3, the label 201 is removed and also the stacked label "DEF" is replaced with the label "ABC" so that the packet is turned back onto the counterclockwise ring, and further, in the node #2, the label "ABC" is removed so that the packet is terminated.

Further, the operation at the failure restoration time in the bidirectional changing-over system is basically similar to that in the one directional changing-over system illustrated in FIG. 5. When the restoration from the failure is detected in the node #4, the sending of the failure notifying message Mf is stopped, and as a result, the processing of releasing the bidirectional label binding is performed in each downstream node, and further, in the nodes #3 and #4, the processing of returning the switch 14 to the state in the normal operation time and the processing of returning the label table to the state for the normal operation time are performed.

Next, there will be described a further application example of the above embodiment.

In the above embodiment, there has been described the case where one label is allocated on the link basis. In this case, the path defined for the one directional link is only one. However, it is also possible to realize the basically same protection by allocating a plurality of labels on the link basis, and it becomes possible to achieve the further flexible operation. In the followings, there will be described an application example in which three types of labels are allocated on the link basis, and priorities are set on the labels, to thereby realize the protection according to the priorities.

Figure 12:
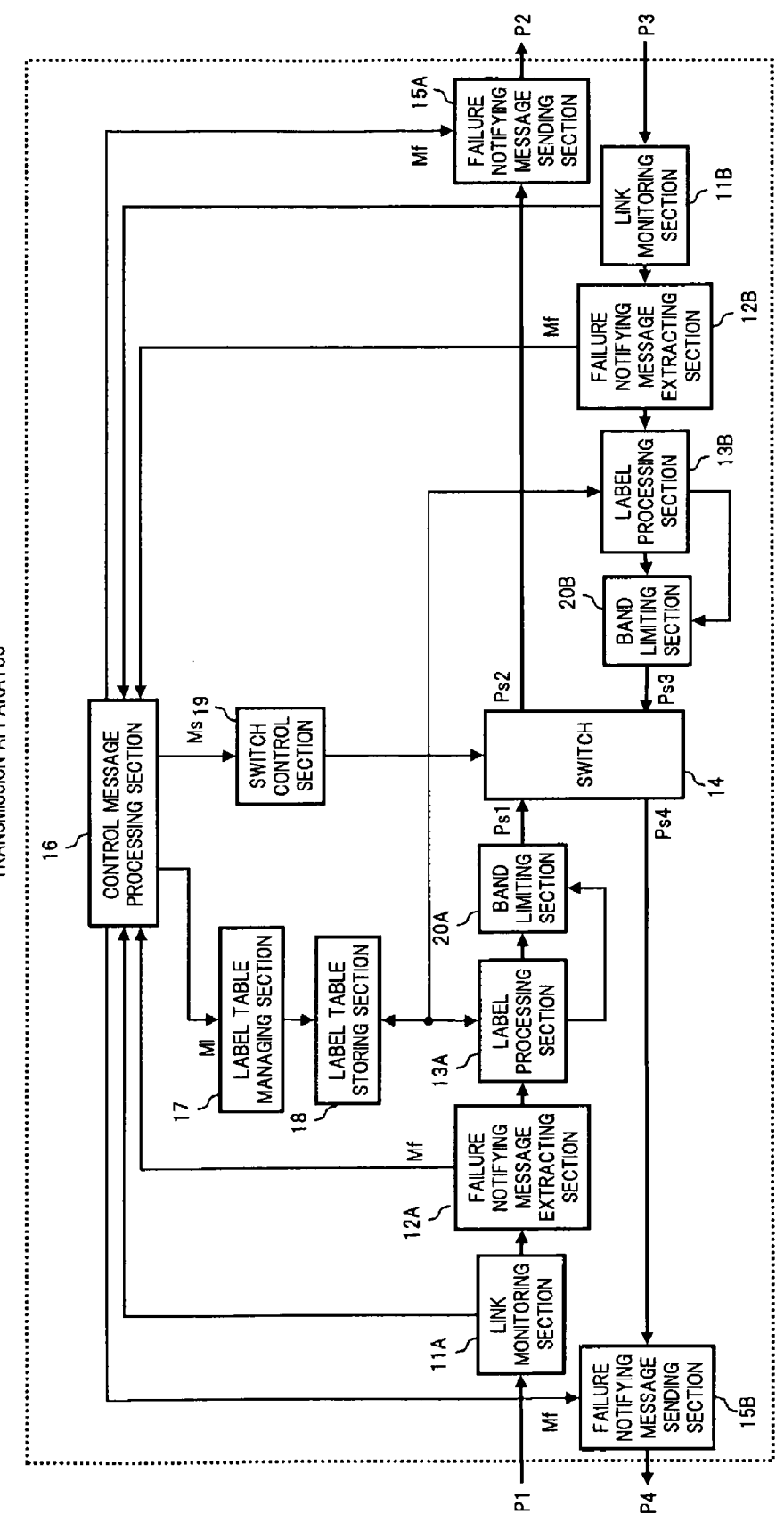
FIG. 12 is a block diagram of a configuration of a transmission apparatus in a further application example for realizing the protection according to priorities.

FIG. 12 is a block diagram illustrating a transmission apparatus applied to each node of the ring network in the above application example.

A configuration of the transmission apparatus in FIG. 12 differs from that in FIG. 1 in that a band limiting section 20A is inserted between the label processing section 13A and the switch 14, and a band limiting section 20B is inserted between the label processing section 13B and the switch 14. The band limiting sections 20A and 20B each enables the limitation of a band relating to the packet of low priority, according to the label replacement processing corresponding to the priorities (to be described later) in each of the label processing sections 13A and 13B.

Figure 13:
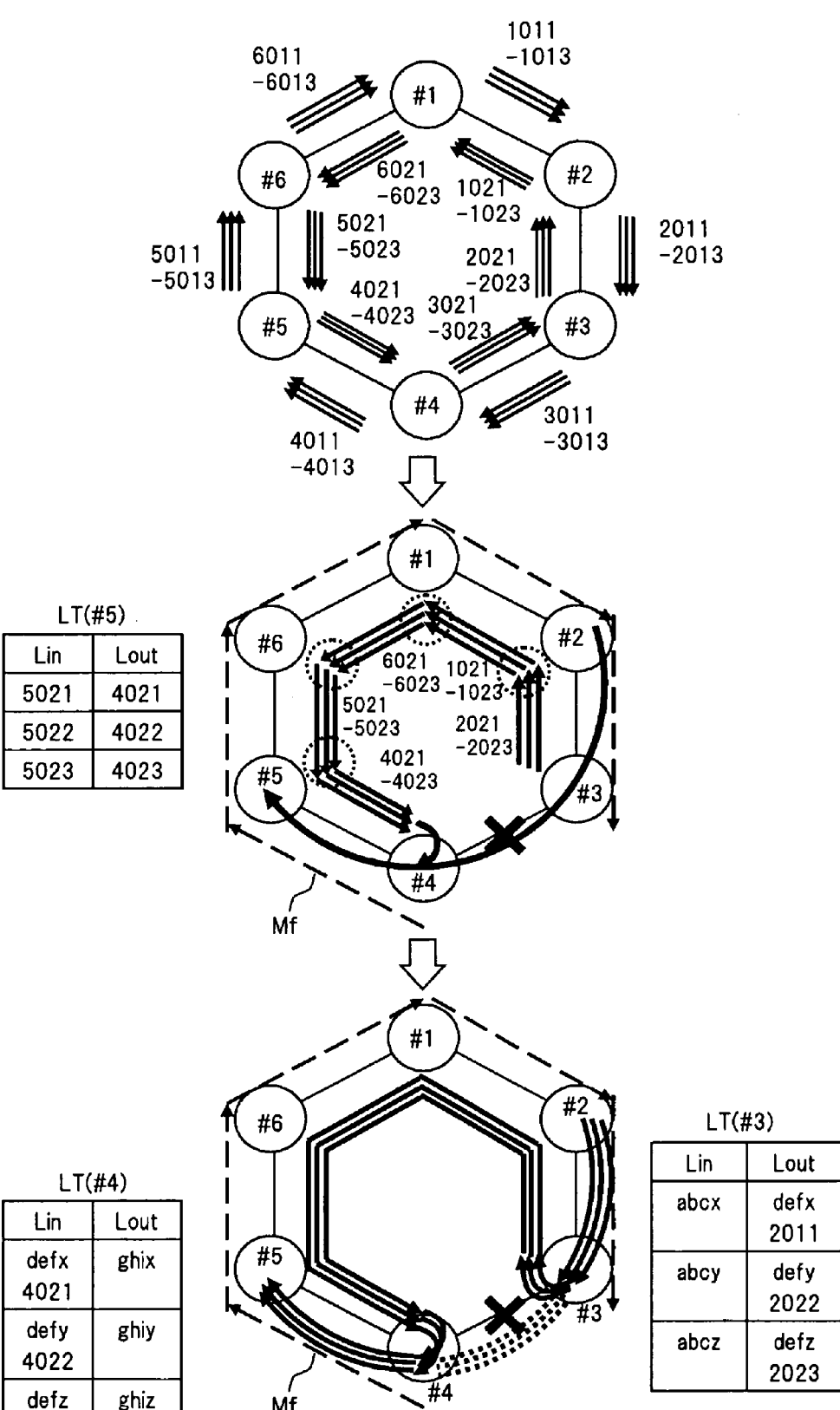
FIG. 13 is a diagram for explaining an operation in the application example of FIG. 12.

FIG. 13 is a diagram illustrating a summary of protection operation in the ring network in which the above transmission apparatus is applied to each node.

In this ring network, as illustrated in the upper stage of FIG. 13, in an initial state before the operation start, three types of labels corresponding to a high priority, a medium priority and a low priority are set individually to the bidirectional transmission paths (links) respectively connecting among the nodes #1 to the nodes #6. Herein, for example, as labels for the clockwise link between the nodes #1 and #2, a label 1011 corresponding to the high priority, a label 1012 corresponding to the medium priority, a label corresponding to the low priority are set, and as labels for the counterclockwise link between the nodes #1 and #2, a label 1021 corresponding to the high priority, a label 1022 corresponding to the medium priority and a label 1023 corresponding to the low priority are set. In accordance with rules similar to the above, labels 2011 to 2013 and labels 2021 to 2023 are set as labels for the links in the respective directions between the nodes #2 and #3, labels 3011 to 3013 and labels 3021 to 3023 are set as labels for the links in the respective directions between the nodes #3 and #4, labels 4011 to 4013 and labels 4021 to 4023 are set as labels for the links in the respective directions between the nodes #4 and #5, labels 5011 to 5013 and labels 5021 to 5023 are set as labels for the links in the respective directions between the nodes #5 and #6, and labels 6011 to 6013 and labels 6021 to 6023 are set as labels for the links in the respective directions between the nodes #6 and #1.

Then, when the failure occurs in the link corresponding to the clockwise ring between the nodes #3 and #4, as exemplarily illustrated in the middle stage of FIG. 13, this failure occurrence is detected in the node #4, so that the failure notifying message Mf is sent out onto the clockwise ring from the node #4 and is sequentially transferred to each downstream node, to be terminated in the node #3. Further, in the node #4, the switch 14 is changed-over so that the ring is turned back.

In each node downstream of the node #4, when the failure notifying message Mf is received, the label binding processing corresponding to the respective priorities is executed. For example, in the node #5, the label table LT(#5) for, when the label of the packet input from the counterclockwise ring side is 5021 corresponding to the high priority, replacing the label 5021 with the label 4021, and when the label of the packet is 5022 corresponding to the medium priority, replacing the label 5022 with the label 4022, and further, when the label of the packet is 5023 corresponding to the low priority, replacing the label 5023 with the label 4023, to forward the packet added with the label 4023, is created to be stored. Similarly to this, in each of the remaining nodes #6, #1 and #2, the label table is created to be stored.

In the node #3 which finally received the failure notifying message Mf from the node #4, the changing-over processing of the switch 14 for turning back the ring and the processing of rewriting the label of the packet input from the clockwise ring side according to the priorities are performed. Relating to the label rewriting processing in the node #3, herein, it is assumed that, in the normal operation time, in the node #2, a label "abcx" is allocated to the packet of high priority, a label "abcy" is allocated to the packet of medium priority, and a label "abcz" is allocated to the packet of low priority. In such a case, in the node #3, the label table LT(#3) for, when the label of the packet input from the clockwise ring side is "abcx", replacing the label "abcx" with a label "defx" to stack the label "defx" on the label 2021 added in advance of the replacement; and when the input label is "abcy", replacing the label "abcy" with a label "defy" to stack the label "defy" on the label 2022 added in advance of the replacement; and further, when the input label is "abcz", replacing the label "abcz" with a label "defz" to stack the label "defz" on the label 2023 added in advance of the replacement, is created to be stored (the right side in the lower stage of FIG. 13).

Further, in the node #4 facing the node #3, as the rewriting processing of the label table, the label table LT(#4) for, when the label of the packet input from the counterclockwise ring side is 4021, removing the label 4021 to replace the stacked label "defx" with a label "ghix"; and when the input label is 4022, removing the label 4022 to replace the label "defy" with a label "ghiy"; and further, when the input label is 4023, removing the label 4023 to replace the label "defz" with a label "ghiz", is created to be stored (the left side in the lower stage of FIG. 13).

According to a series of processing as described above, three label paths according to the priorities for bypassing the failure in the link between the nodes #3 and #4 are formed. Thus, for example, the packet of high priority to be transmitted from the node #2 to the node #5 is added with the label "abcx" in the node #2, and in the node #3, the label "abcx" is replaced with the label "defx" which is stacked on the label 202 added in advance of the replacement, so that the packet is turned back to the counterclockwise bypassing path. Then, in each of the nodes #2, #1, #6 and #5, the label 2021 is sequentially replaced with the label 1021 → the label 6021 → the label 5021 → the label 4021, and in the node #4, the label 4021 is removed, and also, the stacked label "defx" is replaced with the label "ghix", so that the packet is turned back onto the clockwise ring, and further, in the node #5, the label "ghix" is removed so that the packet is terminated. Further, in the case where the band of the bypassing path formed at the failure occurrence is deficient so that all of the user data cannot be relieved, for example in the band limiting section 20A, a part or all of the packet of low priority is discarded to thereby limit the band, so that the bypassing path for the packet of high priority is ensured. Thus, it becomes also possible to perform the further flexible system operation at the failure occurrence.

Incidentally, the operation at the failure restoration time in the protection according to the priorities is basically similar to that in FIG. 5. When the restoration from the failure is detected in the node #4, the sending of the failure notifying message Mf is stopped, and as a result, the processing of releasing the label binding corresponding to the priorities is performed in each downstream node, and in each of the nodes #3 and #4, the processing of returning the switch 14 to the state in the normal operation time and the processing of returning the label table to the state for the normal operation time are performed.

Next, there will be described an application example different from the above application example.

In the above embodiment, there has been described the protection in the network configured by a set of rings corresponding to the clockwise and the counterclockwise. However, it is possible to realize the basically similar protection for a network configured by a plurality of rings. In the followings, there will be described an application example for a network in which two sets of rings are connected.

Figure 14:
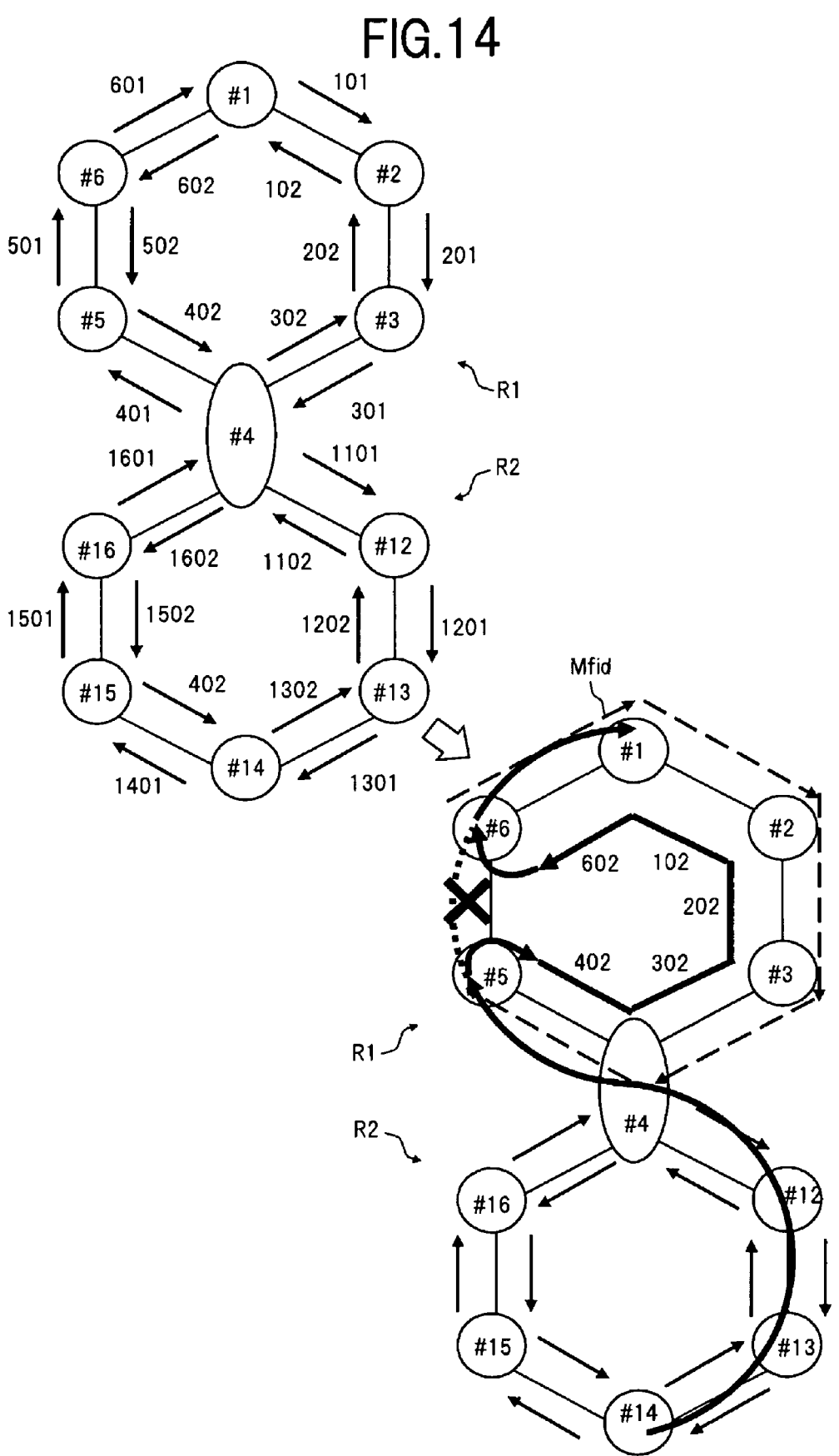
FIG. 14 is a diagram for explaining an operation of a further application example corresponding to a network connecting two sets of rings.

FIG. 14 is a diagram illustrating a summary of protection operation in the above application example.

The ring network illustrated in FIG. 14 is configured such that a first ring R1 and a second ring R2, in each of which six nodes are connected in a ring shape via bidirectional transmission paths, are mutually connected while sharing the shared node #4 with each other. To respective links connecting the respective nodes #1 to #6 on the first ring R1, similarly to the above embodiment, the labels 101, 102 to 106 and 602 are individually set. Further, in the second ring R2, a label for a clockwise link between the node #4 and a node #12 is set at 1101, a label for a counterclockwise link between the nodes #4 and #12 is set at 1102. Similarly to this, labels for links between the node #12 and a node #13 are set at 1201 and 1202, labels for links between the node #13 and a node #14 are set at 1301 and 1302, labels for links between the node #14 and a node #15 are set at 1401 and 1402, labels for links between the node #15 and a node #16 are set at 1501 and 1502, and labels for links between the nodes #16 and #4 are set at 1601 and 1602 (the upper left side of FIG. 14).

Figure 15:
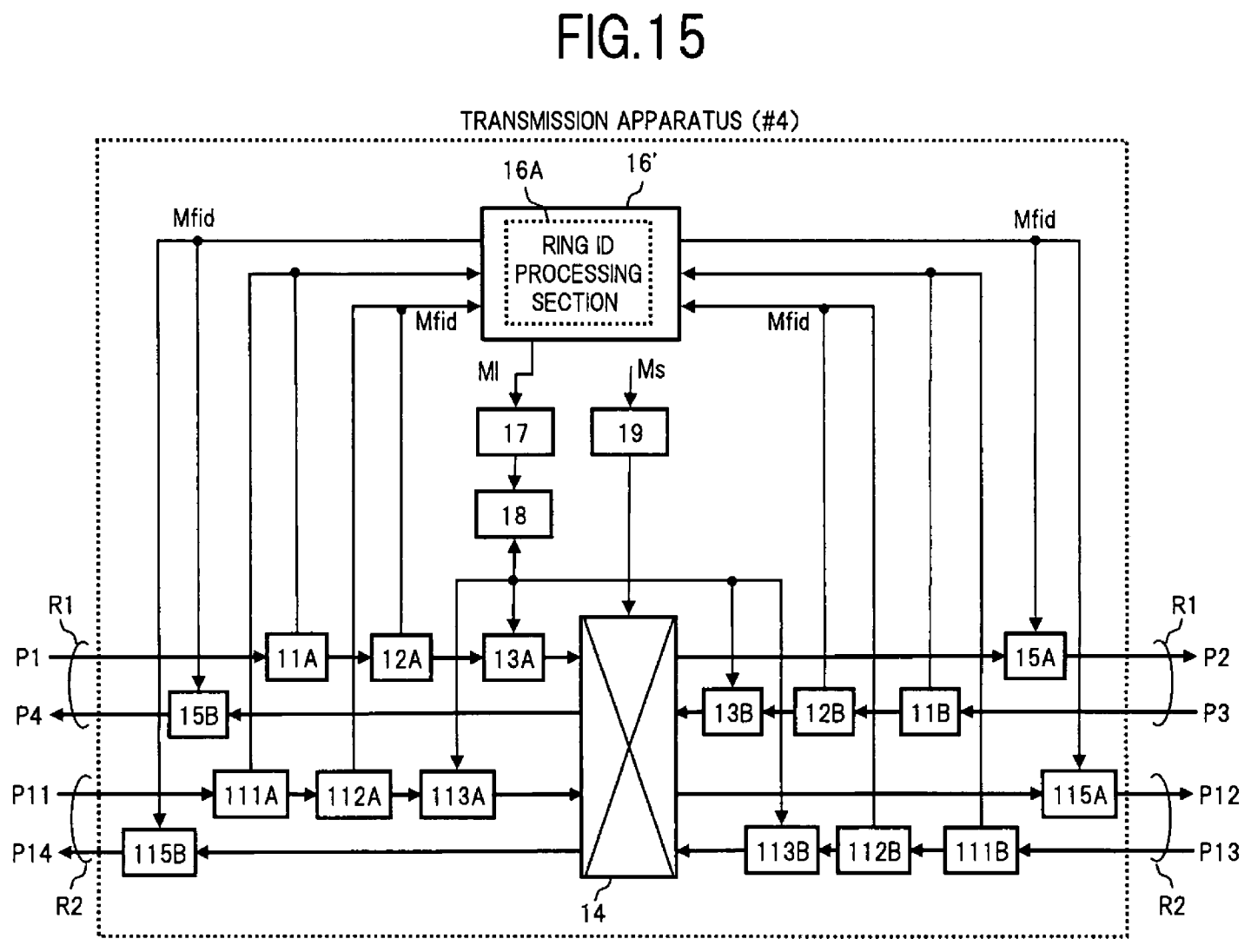

FIG. 15 is a block diagram illustrating a configuration example of a transmission apparatus applied to the shared node #4.

In the configuration example of FIG. 15, the input port P1 and the output port P2 are connected to a clockwise ring on the first ring R1 side, and the input port P3 and the output port P4 are connected to a counterclockwise ring on the first ring R1 side. Further, an input port 11 and an output port P12 are connected to a clockwise ring on the second ring R2 side, and an input port P13 and an output port P14 are connected to a counterclockwise ring on the second ring R2 side. On signal paths among the input and output ports, there are sequentially arranged link monitoring sections 11A, 11B, 111A and 111B; failure notifying message extracting sections 12A, 12B, 112A and 112B; label processing sections 13A, 13B, 113A and 113B; the switch 14; and failure notifying message sending sections 15A, 15B, 115A and 115B. Note, the switch 14 is disposed over the four signal paths. Further, a control message processing section 16', the label table managing section 17, the label table storing section 18 and the switch control section 19 are disposed commonly to the respective signal paths.

In the control message processing section 16', a ring ID processing section 16A is disposed as an additional function of the control message processing section 16 illustrated in FIG. 1. This ring ID processing section 16A, as described later, adds a ring ID to the failure notifying message to be sent out at the failure occurrence and analyzes the ring ID of the failure notifying message sent from the other node. This ring ID enables the discrimination as to whether the failure occurs in either the ring R1 or the ring R2. Herein, the failure notifying message added with the ring ID is expressed as Mfid.

Incidentally, the respective constituent elements of the node #4 except for the control message processing section 16' are same as those in the above described embodiment. Further, a transmission apparatus applied to each of the remaining nodes other than the shared node #4 has a configuration basically same as that of the transmission apparatus illustrated in FIG. 1, except for that the control message processing section 16' added with the ring ID processing section 16 is disposed in place of the control message processing section 16.

In the ring network in which the above transmission apparatus is applied to each node, as illustrated in the lower right side of FIG. 14 for example, when the failure occurs in the clockwise link between the nodes #5 and #6 on the first ring R1 side, this failure occurrence is detected by the link monitoring section 11A of the node #6, and the detection result is transmitted to the control message processing section 16'. In the control message processing section 16' of the node #6, the failure notifying message Mfid added with the ring ID corresponding to the first ring R1 is generated, and is sent out onto the clockwise ring, to be sequentially transferred to each downstream node. At this time, in order to avoid that the failure notifying message Mfid from one of the ring sides is erroneously transferred to the other ring side, the control message processing section 16' of the shared node #4 analyzes the ring ID contained in the received failure notifying message Mfid to verify that the failure notifying message Mfid is sent from the first ring R1 side. Thus, the failure notifying message Mfid from the first ring R1 side is reliably transferred from the node #4 to the node #5.

In each node on the first ring R1 side which received the failure notifying message Mfid sent out from the node #6, similarly to the above described embodiment, among the paths allocated with the labels on the link basis, the link paths adjacent to the own node on the counterclockwise ring side are connected together, and further, in each of the nodes #5 and #6 adjacent to the failed block, the changing-over of the switch 14 and the rewriting of the label table are performed. Thus, the bypassing path from the failed block is formed (the lower right side of FIG. 14), and therefore, for example, when the user data is transmitted from the node #14 on the second ring R2 side to the node #1 on the first ring R1 side, the protection of the user data can be reliably performed in a short time.

Figure 16:
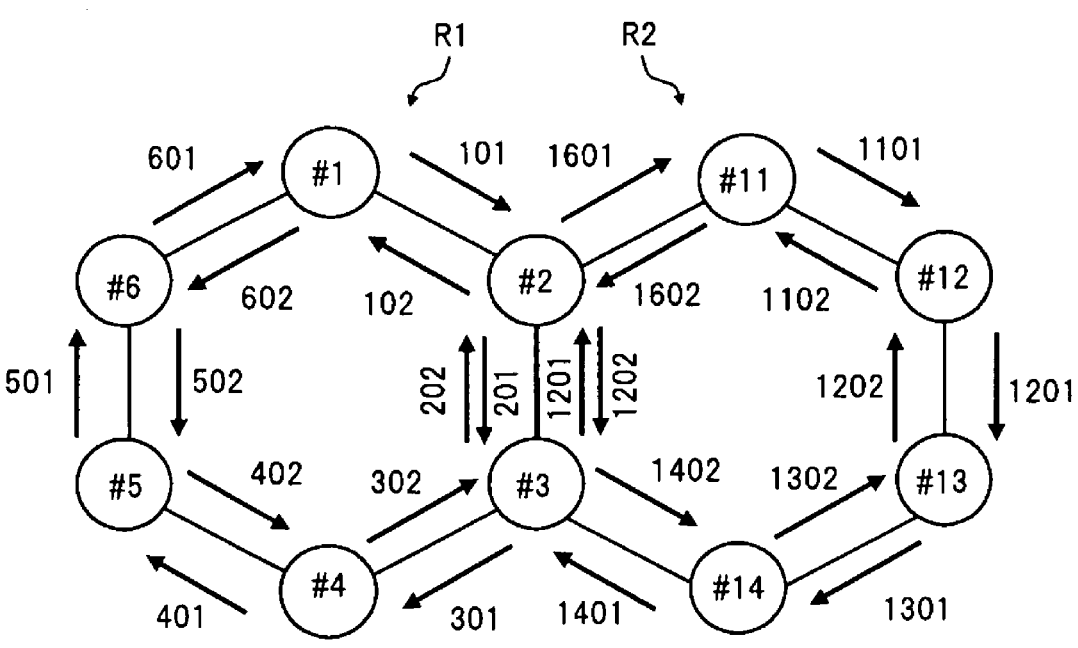
FIG. 16 is a diagram for explaining an operation in a network configuration in which a plurality of shared nodes is disposed, relating to the application example of FIG. 14.
Figure 16:
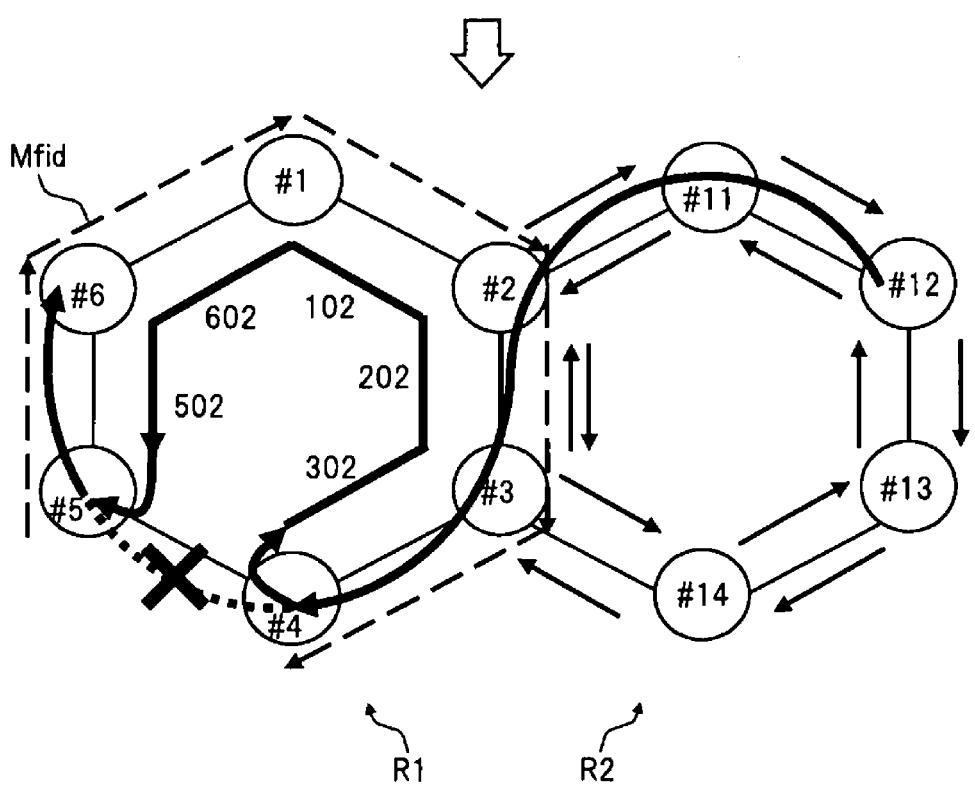
Figure 17:
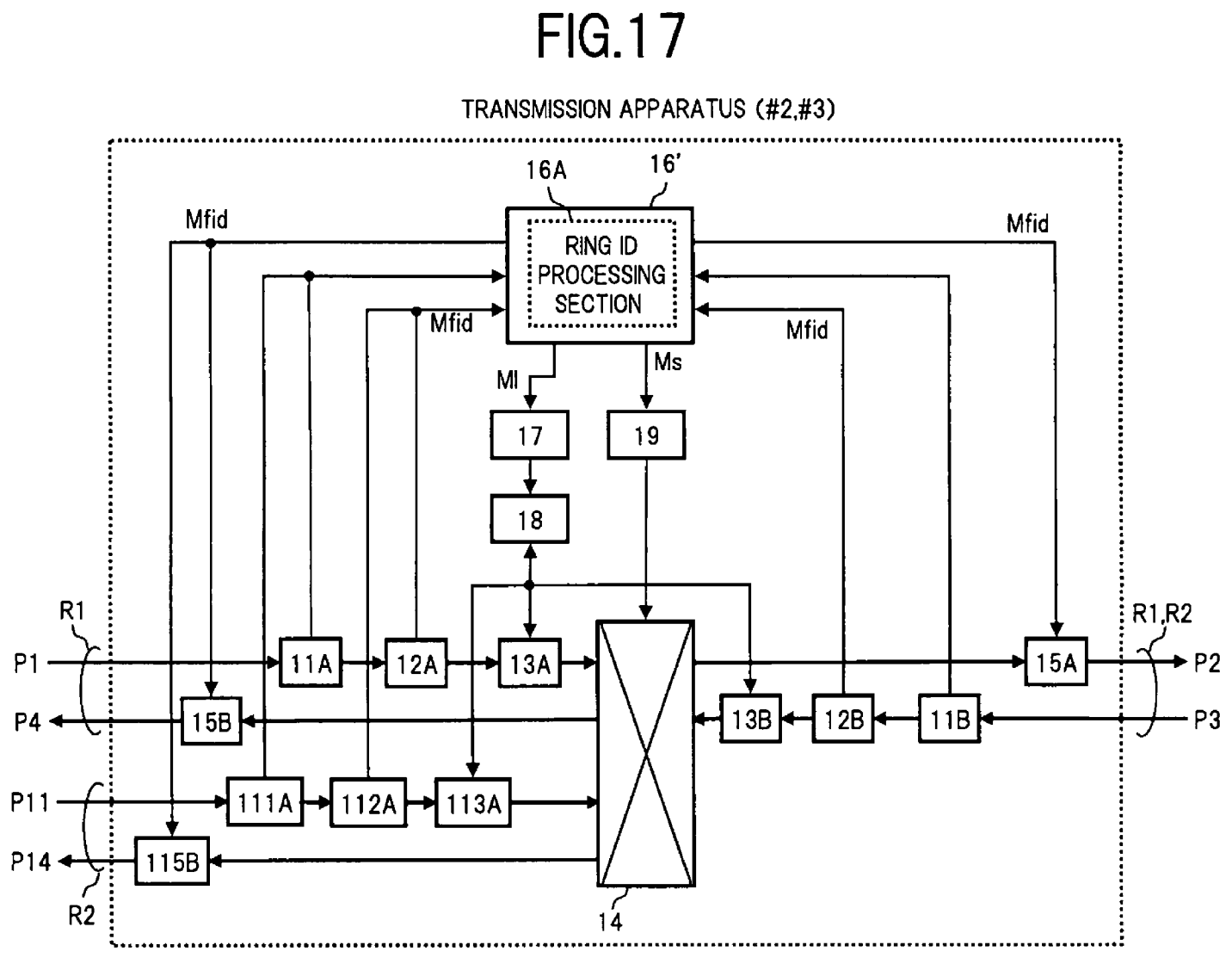
Figure 18:
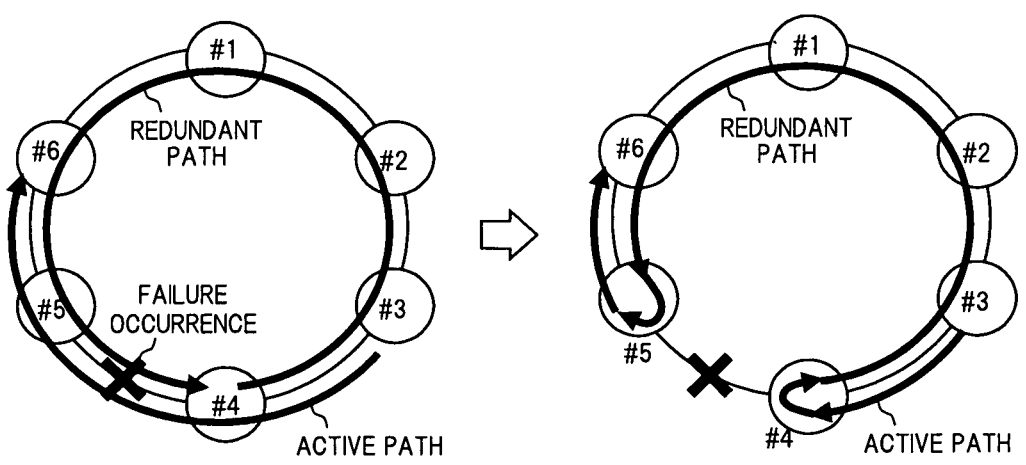
FIG. 18 is a diagram for explaining a conventional protection system in a ring network applied with a label switching system.
Figure 19:
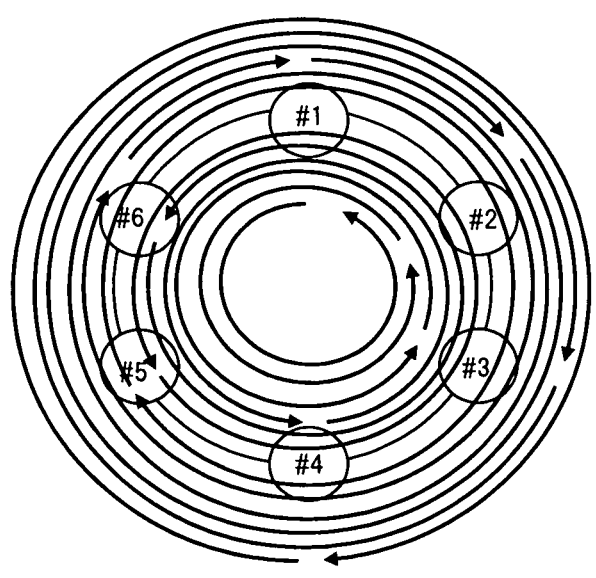
FIG. 19 is a conceptual diagram illustrating redundant paths set in the conventional protection system.

Incidentally, in the above application example, there has been illustrated, as one example, the network configuration in which the first and second rings R1 and R2 shares the one node #4 with each other. However, as illustrated in FIG. 16 for example, even in a network configuration in which a plurality of nodes (nodes #2 and #3 in the example of FIG. 16) and a link between the nodes are shared by the first and second rings R1 and R2, it is possible to realize the similar protection. In such a network configuration, as illustrated in the upper stage of FIG. 16, to the link between the nodes #2 and #3 shared by the first and second rings R1 and R2, the labels 201 and 202 corresponding to the respective directions on the first ring R1 side and the labels 1201 and 1202 corresponding to the respective directions on the second ring R2 side are previously set. Further, a transmission apparatus to be applied to each of the shared nodes #2 and #3 has a configuration as illustrated in FIG. 17 for example. Also in a configuration example of this transmission apparatus, similarly to that illustrated in FIG. 15, the control message processing section 16' including the ring ID processing section 16A is applied. According to such a configuration, similarly to the configuration illustrated in FIG. 14, it becomes possible to perform the protection exemplarily illustrated by a bold line arrow in the lower stage of FIG. 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A transmission method for performing an avoidance control at a failure occurrence in a ring network which applies a label switching system among a plurality of nodes connected in a ring shape to transmit a packet bidirectionally, comprising the processes of:

previously and individually setting only labels to be used at the failure occurrence to links in respective directions among all nodes, each of the links connecting adjacent nodes with one direction;

when a failure occurs in a ring in either direction, in a node positioned on a termination point of a failed block, sending out a failure notifying message which notifies the failure occurrence to the ring in the same direction, and at the same time, connecting between an output port on the same directional ring side in an own node which sends the failure notifying message and an input port on the opposite directional ring side in the own node to thereby form a path for turning back the rings of respective directions, and also, rewriting a label table of the own node corresponding to the formed path in accordance with the labels to be used at the failure occurrence, to store the label table;

sequentially transferring the failure notifying message sent out onto the ring in the same direction by each node on a downstream side from the node which sent the failure notifying message, and at the same time, in each node transferred the failure notifying message, for the labels to be used at the failure occurrence, creating a label table for connecting together two links adjacent to an own node which transfers the failure notifying message on the opposite directional ring side in accordance with the labels to be used at the failure occurrence, to store the label table;

terminating the failure notifying message sequentially transferred by each downstream node at the node positioned on a starting point of the failed block, and at the same time, in the node at which the failure notifying message is terminated, connecting between an input port on the same directional ring side in an own node which terminates the failure notifying message and an output port on the opposite directional ring side in the own node to thereby form a path for turning back the rings of respective directions, and also, rewriting a label table of the own node corresponding to the formed path in accordance with the labels to be used at the failure occurrence, to store the label table; and during the failure occurrence, in each node, label switching the packet that has reached the failed block in accordance with the label table stored in each node to transmit it, thereby making the packet bypass the failed block.

2. A transmission method according to claim 1, further comprising the processes of:

when the ring is restored from the failure, in the node positioned on the termination point of the failed block, stopping the failure notifying message sent to the ring in the same direction, and also, forming a path connecting the input and output ports on the same directional ring side in the own node and rewriting the label table in the own node corresponding to the formed path, to store the label table; and when the failure notifying message is stopped, in each node that has been transferred the failure notifying message, releasing the connection of the two links for the labels to be used at the failure occurrence, and also, in the node at which the failure notifying message is terminated, forming a path connecting between the input and output ports on the same directional ring side in the own node and rewriting the label table of the own node corresponding to the formed path, to store the label table.

3. A transmission method according to claim 1, wherein the failure notifying message contains information relating to labels corresponding to the failed block, and the node positioned on the starting point of the failed block terminates the failure notifying message, based on the information relating to the labels corresponding to the failed block, which is contained in the failure notifying message.

4. A transmission method according to claim 1, wherein each downstream node that has received the failure notifying message returns a response signal to the failure notifying message, and the node positioned on the termination point of the failed block judges the node positioned on the starting point of the failed block based on the response signal from each downstream node, to resend the failure notifying message to the node positioned on the starting point of the failed block.

5. A transmission method according to claim 1, wherein the node positioned on the termination point of the failed block detects the failure in the link adjacent thereto on an upstream side to send the failure notifying message.

6. A transmission method according to claim 1, wherein the node positioned on the termination point of the failed block detects the failure in the node adjacent thereto on an upstream side to send the failure notifying message.

7. A transmission method according to claim 1, wherein each node that has been transferred the failure notifying message creates, for the labels to be used at the failure occurrence, the label table for connecting the two links adjacent to the own node on the opposite directional ring side as well as the two links adjacent to the own node on the same directional ring side, to stored the label table.

8. A transmission method according to claim 1, wherein when priorities are set to packets transmitted over the rings in respective directions, the process of previously and individually setting the labels to be used at the failure occurrence sets a plurality of labels to be used at the failure occurrence to each of the links in respective directions among all nodes, and each node that has been transferred the failure notifying message creates, for the labels to be used at the failure occurrence, the label table for connecting priority-correspondent two links adjacent to the own node on the opposite directional ring side, to store the label table.

9. A transmission method according to claim 1, wherein when the ring network has a configuration in which a plurality of rings corresponding to the bidirectional transmission is connected to each other, the failure notifying message contains a ring ID enabling the discrimination of the ring in which the failure occurs among the plurality of rings, and a shared node on the plurality of rings, when the failure notifying message is received, transfers the failure notifying message to each node on a downstream side from the node which sent the failure notifying message on the ring in which the failure occurs, according to the ring ID contained in the failure notifying message.

10. A transmission apparatus applied to each of a plurality of nodes in a ring network for applying a label switching system among the plurality of nodes connected in a ring shape to transmit a packet bidirectionally, comprising:

two sets of input and output ports respectively connected to rings in respective directions;

a switch which changes over signal paths between the two sets of input and output ports;

a switch control section configured to control the switch;

a failure detecting section configured to detect whether a failure occurs on the rings in respective directions, based on states of input signals to the respective input ports;

a failure notifying message extracting section configured to extract a failure notifying message which notifies of the failure occurrence, sent out from a different node, based on the signals input to the respective input ports;

a label table storing section configured to store a label table;

a label table managing section in which only labels to be used at the failure occurrence are previously and individually set to links in respective directions among all nodes, each of the links connecting adjacent nodes with one direction, and the label table managing section is configured to manage the label table in the label table storing section;

a label processing section configured to add, replace or remove the labels to the packet in accordance with the label table in the label table storing section; and a control message processing section configured to generate the failure notifying message which notifies of the failure occurrence, when the failure occurrence on the ring in either direction is detected by the failure detecting section, to send the failure notifying message onto the same directional ring, and also, configured to generate a switch change-over message which instructs connection of the output port on the same directional ring side and the input port on the opposite directional ring side to thereby form a path for turning back the ring in each direction, to output the switch change-over message to the switch control section, and configured to generate a label processing message which instructs rewriting of the label table corresponding to the formed path, to output the label processing message to the label table managing section; and when the failure notifying message from the different node is extracted by the failure notifying message extracting section, if an own node of the transmission apparatus is not positioned on a starting point of a failed block, configured to transfer the failure notifying message from the different node to the node on a downstream side from the own node on the same directional ring, and also, for the labels to be used at the failure occurrence, configured to generate a label processing message which instructs creation of the label table connecting the two links adjacent to the own node on the opposite directional ring side, to output the label processing message to the label table managing section, and if the own node is positioned on the starting point of the failed block, configured to terminate the failure notifying message from the different node, and also, configured to generate a switch change-over message which instructs connection of the input port on the same directional ring side and the output port on the opposite directional ring side to thereby form a path for turning back the ring in each direction, to output the switch change-over message to the label table managing section, and also, configured to generate a label processing message which instructs the rewriting of the label table corresponding to the formed path, to output it-the label processing message to the label table managing section.

11. A transmission apparatus according to claim 10, wherein when the restoration from the failure is detected by the failure detecting section, the control message processing section stops the failure notifying message sent to the same directional ring, and also, generates a switch change-over message which instructs to form a path connecting between the input and output ports on the same directional ring side, to output the switch change-over message to the switch control section and generates a label processing message which instructs to rewrite the label table corresponding to the formed path, to output the label processing message to the label table managing section; and when the failure notifying message from the different node is not extracted by the failure notifying message extracting section, if the own node is not positioned on the starting point of the failed block, the control message processing section generates a label processing message which instructs to release the connection of the two links for the labels to be used at the failure occurrence, to output the label processing message to the label table managing section, and if the own node is positioned on the starting point of the failed block, the control message processing section generates a switch change-over message which instructs to form a path connecting the input and output ports on the same directional ring side, to output the switch change-over message to the switch control section and generates a label processing message which instructs to rewrite the label table corresponding to the formed path, to output the label processing message to the label table managing section.

12. A transmission apparatus according to claim 10, wherein the control message processing section generates the failure notifying message containing information relating to the labels corresponding to the failed block, to output the failure notifying message to the same directional ring.

13. A transmission apparatus according to claim 10, wherein the control message processing section sends out the failure notifying message to the same directional ring, and thereafter, judges the node positioned on the starting point of the failed block based on a response signal to the failure notifying message returned from each node on a downstream side from the own node, to resend out the failure notifying message to the node positioned on the starting point of the failed block.

14. A transmission apparatus according to claim 10, wherein when the failure notifying message from the different node is extracted by the failure notifying message extracting section, if the own node is not positioned on the starting point of the failed block, the control message processing section generates a label processing message which instructs to create, for the labels to be used at the failure occurrence, the label table for connecting the two links adjacent to the own node on the opposite directional ring side as well as the two links adjacent to the own node on the same directional ring side, to output the label processing message to the label table managing section.

15. A transmission apparatus according to claim 10, wherein when priorities are set for packets transmitted over the rings in respective directions, the label table managing section registers therein a plurality of labels to be used at the failure occurrence according to set numbers of the priorities, and the control message processing section, when the failure notifying message from the different node is extracted by the failure notifying message extracting section, if the own node is not positioned on a starting point of the failed block, generates a label table processing message which instructs to create, for the labels to be used at the failure occurrence, a label table for connecting priority-correspondent two links adjacent to the own node on the opposite directional ring side, to output the label table processing message to the label table managing section.

16. A transmission apparatus according to claim 10, wherein when the ring network has a configuration in which a plurality of rings corresponding to the bidirectional transmission is connected to each other, the control message processing section, when the failure occurrence is detected by the failure detecting section, generates the failure notifying message containing a ring ID enabling the discrimination of the ring in which the failure occurs among the plurality of rings, to send the failure notifying message to the same directional ring; and when the failure notifying message from the different node is extracted by the failure notifying message extracting section, if the own node corresponds to a shared node on the plurality of rings and is not positioned on the starting point of the failed block, transfers the failure notifying message to the node on a downstream side from the own node on the ring in which the failure occurs, according to the ring ID contained in the extracted failure notifying message.

\* \* \* \* \*